US010670144B2

(12) United States Patent
Roland et al.

(10) Patent No.: US 10,670,144 B2
(45) Date of Patent: Jun. 2, 2020

(54) METHOD OF OPERATING A VEHICLE AND A VEHICLE

(71) Applicant: BRP-ROTAX GMBH & CO. KG, Gunskirchen (AT)

(72) Inventors: Guenther Roland, Pasching (AT); Christian Stiebinger, Puchkirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 14 days.

(21) Appl. No.: 15/913,006

(22) Filed: Mar. 6, 2018

(65) Prior Publication Data

US 2018/0195607 A1  Jul. 12, 2018

Related U.S. Application Data

(62) Division of application No. 15/114,043, filed as application No. PCT/IB2015/050797 on Feb. 2, 2015, now Pat. No. 9,945,479.

(Continued)

(51) Int. Cl.
*B60W 10/107* (2012.01)
*F16H 61/662* (2006.01)
(Continued)

(52) U.S. Cl.
CPC ......... *F16H 61/66272* (2013.01); *B62M 9/08* (2013.01); *B62M 27/02* (2013.01);
(Continued)

(58) Field of Classification Search
CPC ... B60W 30/18072; B60W 2510/0604; B60W 2710/1077; B60W 2510/0638;
(Continued)

(56) References Cited

U.S. PATENT DOCUMENTS 4,893,526 A  1/1990 Tokoro
5,069,083 A  12/1991 Hirano et al.
(Continued)

FOREIGN PATENT DOCUMENTS

EP  0421183 A2  4/1991
EP  2128499 A2  12/2009
(Continued)

OTHER PUBLICATIONS

International Search Report of PCT/IB2015/050797; Michael Werner; dated Aug. 7, 2015.
(Continued)

*Primary Examiner* — Roger L Pang
(74) *Attorney, Agent, or Firm* — BCF LLP

(57) ABSTRACT

A method of operating a vehicle having an engine, a throttle valve and a throttle operator. A continuously variable transmission is operatively connected to the engine and has a driving pulley, a driven pulley, and a belt operatively connecting therebetween. At least one ground engaging member is operatively connected to the driven pulley and includes at least one of a wheel and a track. A piston is operatively connected to the driving pulley for applying a piston force to the driving pulley when actuated and thereby changing an effective diameter of the driving pulley. A control unit controls actuation of the piston and the piston force. The method includes determining an engine speed, and controlling the piston force based on the engine speed.

7 Claims, 17 Drawing Sheets

Related U.S. Application Data

(60) Provisional application No. 61/934,498, filed on Jan. 31, 2014.

(51) Int. Cl.

| | | |
|---|---|---|
| *F16H 59/62* | (2006.01) | |
| *F16H 59/36* | (2006.01) | |
| *F16H 59/24* | (2006.01) | |
| *B62M 9/08* | (2006.01) | |
| *B62M 27/02* | (2006.01) | |
| *F16H 9/14* | (2006.01) | |
| *B60W 30/18* | (2012.01) | |
| *F16H 59/44* | (2006.01) | |
| *B62J 99/00* | (2020.01) | |

(52) U.S. Cl.
CPC .............. *F16H 9/14* (2013.01); *F16H 59/24* (2013.01); *F16H 59/36* (2013.01); *F16H 59/62* (2013.01); *B60W 10/107* (2013.01); *B60W 30/181* (2013.01); *B60W 30/18018* (2013.01); *B60W 30/18027* (2013.01); *B60W 30/18072* (2013.01); *B60W 2510/0604* (2013.01); *B60W 2510/0638* (2013.01); *B60W 2510/0676* (2013.01); *B60W 2510/104* (2013.01); *B60W 2550/13* (2013.01); *B60W 2710/1077* (2013.01); *B62J 2099/002* (2013.01); *B62K 2207/04* (2013.01); *F16H 2059/366* (2013.01); *F16H 2059/446* (2013.01); *F16H 2061/66209* (2013.01); *Y10T 477/624* (2015.01); *Y10T 477/6237* (2015.01); *Y10T 477/65* (2015.01)

(58) Field of Classification Search
CPC ........ B60W 2510/0676; B60W 10/107; Y10T 477/6237; Y10T 477/6244; Y10T 477/65; F16H 61/66272; F16H 9/14; F16H 2059/366; F16H 56/24; F16H 29/36
See application file for complete search history.

(56) References Cited

U.S. PATENT DOCUMENTS

| | | |
|---|---|---|
| 2002/0165064 A1 | 11/2002 | Miki et al. |
| 2004/0063523 A1* | 4/2004 | Jozaki ............... F16H 61/66272 474/18 |
| 2005/0014604 A1 | 1/2005 | Sakakibara et al. |
| 2009/0176618 A1 | 7/2009 | Inoue |
| 2010/0017080 A1 | 1/2010 | Shimizu et al. |
| 2011/0275464 A1 | 11/2011 | Okubo et al. |
| 2013/0041563 A1 | 2/2013 | Komiya et al. |
| 2013/0260929 A1 | 10/2013 | Oayama et al. |
| 2013/0275017 A1 | 10/2013 | Gauthier et al. |
| 2014/0004984 A1 | 1/2014 | Aitcin |
| 2014/0128187 A1* | 5/2014 | Iraha .................. F16H 61/0206 474/8 |
| 2015/0240941 A1* | 8/2015 | Zhang .................... F16H 61/12 701/61 |
| 2016/0223078 A1 | 8/2016 | Honma et al. |

FOREIGN PATENT DOCUMENTS

| | | |
|---|---|---|
| GB | 935295 A | 8/1963 |
| JP | 2001295918 A | 10/2001 |
| RU | 2466881 C2 | 11/2012 |
| WO | 2014052725 A2 | 4/2014 |

OTHER PUBLICATIONS

English abstract of JP2001295918; retrieved from https://worldwide.espacenet.com/ on Jul. 25, 2016.
Non-final Office Action issued in connection with U.S. Appl. No. 15/912,992; Roger L. Pang; Aug. 23, 2019.
Search Report issued by the Russian Patent Office in connection with the corresponding application No. 2016134025, dated Oct. 25, 2018.
English Abstract of RU2466881C2 retrieved from https://worldwide.espacenet.com/ on Nov. 7, 2018.
Intention to Grant Patent issued from the EPO dated Feb. 3, 2020 in connection with the corresponding Patent Application No. 15703633.6 and including references considered by the Examiner on the last page.

* cited by examiner

METHOD OF OPERATING A VEHICLE AND A VEHICLE

CROSS-REFERENCE

The present application is a divisional of U.S. patent application Ser. No. 15/114,043, filed on Jul. 25, 2016, which is a national phase entry of International Patent Application No. PCT/IB2015/050797, filed on Feb. 2, 2015, which claims priority to U.S. Provisional Patent Application No. 61/934,498, filed on Jan. 31, 2014, the entirety of all of which is incorporated herein by reference.

The present application is related to International Patent Application No. PCT/US2013/062125 filed on Sep. 27, 2013, U.S. Provisional Patent Application No. 61/758,322 filed Jan. 30, 2013, and U.S. Provisional Patent Application No. 61/768,285 filed on Feb. 22, 2013, the entirety of all of which is incorporated herein by reference.

TECHNICAL FIELD

The present technology relates generally to a continuously variable transmission and to vehicle control methods.

BACKGROUND

Endless belt type continuously variable transmissions (CVT) are used in many types of vehicles such as snowmobiles, all terrain vehicles (ATVs), scooters and the like to obtain an infinite number of gear ratios between the engine and the vehicle's wheels. Typically, the CVTs are mechanically controlled by means of centrifugal weights (usually on the driving side) acting against the force of a spring to provide the desired gear ratios. CVT characteristics, including variation of the gear ratio as a function of engine speed, vehicle speed, torque and the like, can be tailored by appropriate choice of flyweights and spring on the driving side, and the cams on the driven side.

Mechanically controlled CVTs have limited control options as the configuration of the different components cannot be changed on-the-fly based on operating conditions. Mechanically controlled CVTs can have poor power efficiency due to frictional losses arising from the belted construction. Furthermore, when driving at constant high speeds, the engine, and other related elements inside the engine, operating at high rotational speeds (RPM) cause undesirable noise and vibrations, as well as high fuel consumption.

In some CVTs, especially in stationary applications, the mechanical controls have been replaced by a pneumatic or hydraulic system for changing the CVT gear ratio. Such fully controlled CVTs, where one or both of the pulleys is controlled, whether hydraulically, pneumatically or electrically, require the attachment of additional components to the CVT, such as pumps and reservoirs, adding to its weight and cost. Furthermore, in such systems any loss of CVT control could result in the vehicle becoming inoperable.

There is thus a need for a method of controlling a CVT which allows for fast and efficient adjustments of its configuration based on vehicle operating conditions.

SUMMARY

It is an object of the present technology to ameliorate at least some of the inconveniences present in the prior art.

According to one aspect of the present technology, there is provided a method of operating a vehicle at different altitudes. The vehicle includes an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. The method includes determining at least one of an altitude and an atmospheric pressure, determining a driven pulley speed, and determining at least one of the throttle operator position and the throttle valve position. The piston is selectively actuated based on the at least one of the altitude and the atmospheric pressure. The piston force is controlled based on the driven pulley speed and the at least one of the throttle operator position and the throttle valve position.

In some implementations, the piston force is controlled based on a control map.

In some implementations, the control map includes a first control map corresponding to a first altitude, and a second control map corresponding to a second altitude.

In some implementations, the one of the altitude and the atmospheric pressure is the altitude. The piston force is set to be zero responsive to the determined altitude being greater than a high altitude threshold.

In some implementations, the vehicle further comprises a mode switch for selecting one of a plurality of modes of operation of the vehicle. The method further includes determining the one of the plurality of modes of operation that has been selected, and controlling the piston force based at least in part on the selected one of the plurality of modes of operation of the vehicle.

In some implementations, the piston force is controlled based on a control map associated with the selected one of the plurality of modes of operation of the vehicle.

In some implementations, an engine speed is determined, the piston force is set to be at least as great as a minimum piston force, the minimum piston force being predefined based on the determined engine speed.

In some implementations, the vehicle further comprises a plurality of centrifugal weights operatively connected to the driving pulley for controlling the effective driving pulley diameter. The method further includes controlling the effective diameter of the driving pulley, via the centrifugal weights, responsive to a driving pulley speed.

In some implementations, the piston is at least one of pneumatically actuated and hydraulically actuated.

According to another aspect of the present technology, there is provided a method of operating a vehicle. The vehicle includes an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. The method includes determining at least one of the throttle operator position and the throttle valve position, detecting a parking/drive away condition indicative of one of a parking operation and a drive-away operation of the vehicle, and responsive to the detection of the parking/drive away condition, actuating the piston and controlling the piston force based on the at least one of the throttle operator position and the throttle valve position.

In some implementations, the parking/drive away condition includes a vehicle speed being lower than a parking threshold vehicle speed, and an engine speed being lower than a parking threshold engine speed. The method further includes determining an engine speed, and determining a vehicle speed.

In some implementations, the parking threshold vehicle speed is 10 km/h.

In some implementations, the parking threshold driven pulley speed is 1500 rpm.

In some implementations, the vehicle further includes a brake operatively connected to the ground engaging member, and the parking/drive away condition further includes the brake being unactuated.

In some implementations, the vehicle further comprises an engine coolant temperature sensor sensing an engine coolant temperature. The method further includes determining the engine coolant temperature, and controlling the piston force based on the engine coolant temperature.

In some implementations, the piston force is a first piston force when the engine coolant temperature is a first engine coolant temperature, the first engine coolant temperature being lower than a threshold engine coolant operating temperature. The piston force is a second piston force when the engine coolant temperature is a second engine coolant temperature. The second engine coolant temperature is higher than the threshold engine coolant operating temperature. The second piston force is lower than the first piston force.

In some implementations, the piston force is controlled independently of an engine speed when the parking/drive away condition is detected.

In some implementations, the piston force is controlled independently of a driven pulley speed when the parking/drive away condition is detected.

In some implementations, the vehicle further comprises a mode switch for selecting one of a plurality of modes of operation of the vehicle. The method further includes determining the one of the plurality of modes of operation that has been selected, and controlling the piston force based at least in part on the selected one of the plurality of modes of operation of the vehicle.

In some implementations, an engine speed is determined and the piston force is set to be at least as great as a minimum piston force, the minimum piston force being predefined based on the determined engine speed.

In some implementations, the piston is at least one of pneumatically actuated and hydraulically actuated.

According to another aspect of the present technology, there is provided a method of operating a vehicle. The vehicle includes an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. The method includes determining an engine speed and controlling the piston force based on the engine speed.

In some implementations, the piston force is set to be at least as great as a minimum piston force, the minimum piston force being predefined based on the determined engine speed.

In some implementations, at least one of the throttle operator position and the throttle valve position is determined, and a negative load condition indicative of a negative load on the engine is detected. Responsive to the detection of the negative load condition, the piston force is controlled based on an engine speed. The negative load condition includes the engine speed being greater than a downhill threshold engine speed, and at least one of the throttle operation position being lower than a downhill threshold throttle operation position, and the throttle valve position being lower than a downhill threshold throttle valve position.

In some implementations, the piston force is controlled independently of the throttle valve position and the throttle operator position when the negative load condition is detected.

In some implementations, the piston force is controlled independently of a driven pulley speed when the negative load condition is detected.

In some implementations, the vehicle further includes an engine coolant temperature sensor sensing a temperature of an engine coolant. The method further includes determining the engine coolant temperature, and controlling the piston force based on the engine coolant temperature.

In some implementations, the piston force is a first piston force when the engine coolant temperature is a first engine coolant temperature and a second piston force when the engine coolant temperature is a second engine coolant temperature. The first engine coolant temperature is lower than a threshold engine coolant operating temperature. The second engine coolant temperature is higher than the threshold engine coolant operating temperature. The second piston force is lower than the first piston force.

In some implementations, the vehicle further comprises a mode switch for selecting one of a plurality of modes of operation of the vehicle. The method further includes determining the one of the plurality of modes of operation that has been selected, and controlling the piston force based at least in part on the selected one of the plurality of modes of operation of the vehicle.

In some implementations, the piston is at least one of pneumatically actuated and hydraulically actuated.

According to yet another aspect of the present technology, there is provided a method of operating a vehicle. The vehicle includes an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. The method includes detecting a stall condition indicative of the vehicle being stalled, and responsive to the detection of the stall condition, setting the piston force to be zero.

In some implementations, method includes determining a driven pulley speed. The stall condition includes a driven pulley speed of the driven pulley decreasing, and a rate of decrease of the driven pulley speed being greater in magnitude than a stall threshold rate.

In some implementations, the stall threshold rate is 150 rpm/s2.

In some implementations, the vehicle has a brake operatively connected to the at least one ground engaging member, and the stall condition further includes the brake being actuated.

In some implementations, the piston is at least one of pneumatically actuated and hydraulically actuated.

According to yet another aspect of the present technology, there is provided a method of operating a vehicle. The vehicle includes an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. The method includes determining a driven pulley speed of the driven pulley. An uphill stand condition indicative of the vehicle being stopped on an uphill is detected and responsive to the detection of the uphill stand condition, the piston force is controlled based on the driven pulley speed.

In some implementations, the vehicle further includes a brake operatively connected to the at least one ground engaging member. The uphill stand condition includes an actuation of the brake followed by a deactuation of the brake, and at least one of the throttle operator position being lower than an uphill stand throttle operator threshold and the throttle valve position being lower than an uphill stand throttle valve threshold.

In some implementations, an inclination of the ground is sensed and the uphill stand condition further includes the sensed inclination being uphill.

In some implementations, controlling the piston force includes, responsive to the driven pulley speed being negative, increasing the piston force until at least one of the following occurs: the driven pulley speed becomes zero, and the piston force becomes equal to a maximum piston force.

In some implementations, the piston force is increased at a rate such that the piston force increases to the maximum piston force within an uphill stand threshold time period.

In some implementations, the uphill stand threshold time period is one second.

In some implementations, the piston is at least one of pneumatically actuated and hydraulically actuated.

In some implementations, an engine speed is determined and the piston force is set to be at least as great as a minimum piston force, the minimum piston force being predefined based on the determined engine speed.

According to another aspect of the present technology, there is provided a vehicle having an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. An altitude sensor senses at least one of an altitude and an atmospheric pressure. The control unit is configured to control actuation of the piston and the piston force based on the sensed at least one of the altitude and the atmospheric pressure being sensed.

In some implementations, a plurality of centrifugal weights is operatively connected to the driving pulley for controlling an effective diameter thereof.

In some implementations, the vehicle further includes a mode switch for selecting one of a plurality of modes of operation of the vehicle, the control unit being configured to control the piston force based at least in part on the selected one of the plurality of modes of operation of the vehicle.

In some implementations, the vehicle further includes at least one of a hydraulic system and a pneumatic system connected to the piston, the control unit being connected to the at least one of the hydraulic system and the pneumatic system for controlling the piston force.

According to another aspect of the present technology, there is provided a vehicle having an engine, a throttle operator being operable by a driver of the vehicle, a throttle valve regulating airflow to the engine, a throttle valve position of the throttle valve being based at least in part on a throttle operator position of the throttle operator, and a continuously variable transmission (CVT) operatively connected to the engine. The CVT includes a driving pulley, a driven pulley, and a belt operatively connecting the driving pulley to the driven pulley. At least one ground engaging member operatively connects to the driven pulley and includes at least one of: a wheel and a track. A piston is operatively connected to the driving pulley for applying a piston force to the driving pulley when actuated, and thereby changing an effective diameter of the driving pulley. A control unit controls actuation of the piston and the piston force. An engine coolant temperature sensor senses an engine coolant temperature of an engine coolant system of the engine. An engine speed sensor senses an engine speed of the engine. A driven pulley speed sensor senses a driven pulley speed of the driven pulley. The control unit is configured to control actuation of piston and the piston force based on at least one of: the selected one of the plurality of modes of operation of the vehicle, the sensed engine coolant temperature, the sensed engine speed, and the sensed driven pulley speed.

In some implementations, a plurality of centrifugal weights is operatively connected to the driving pulley for controlling an effective diameter thereof.

In some implementations, the vehicle further includes at least one of a hydraulic system and a pneumatic system connected to the piston, the control unit being connected to the at least one of the hydraulic system and the pneumatic system for controlling the piston force.

In some implementations, the vehicle further comprises a piston force selector operable by the driver of the vehicle. The control unit is connected to the piston force selector for receiving a driver selection therefrom and configured to control the piston force based at least in part on the received driver selection.

In another aspect, the method includes controlling the piston force based at least in part on the mode of operation of the vehicle.

For purposes of the present application, terms related to spatial orientation when referring to a vehicle and components in relation to the vehicle, such as "forwardly", "rearwardly", "left", "right", "above" and "below", are as they would be understood by a driver of a vehicle, with the vehicle in a straight ahead orientation (i.e. not steered left or right), and in an upright position (i.e. not tilted).

Definitions of terms provided herein take precedence over definitions provided in any of the documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a snowmobile. However, it is contemplated that the technology could be used in other vehicles, such as, but not limited to, a motorcycle, a three-wheel vehicle and an all-terrain vehicle (ATV). Aspects of the technology could also be applied to motorized devices, other than vehicles, that use a continuously variable transmission (CVT).

Figure 1:
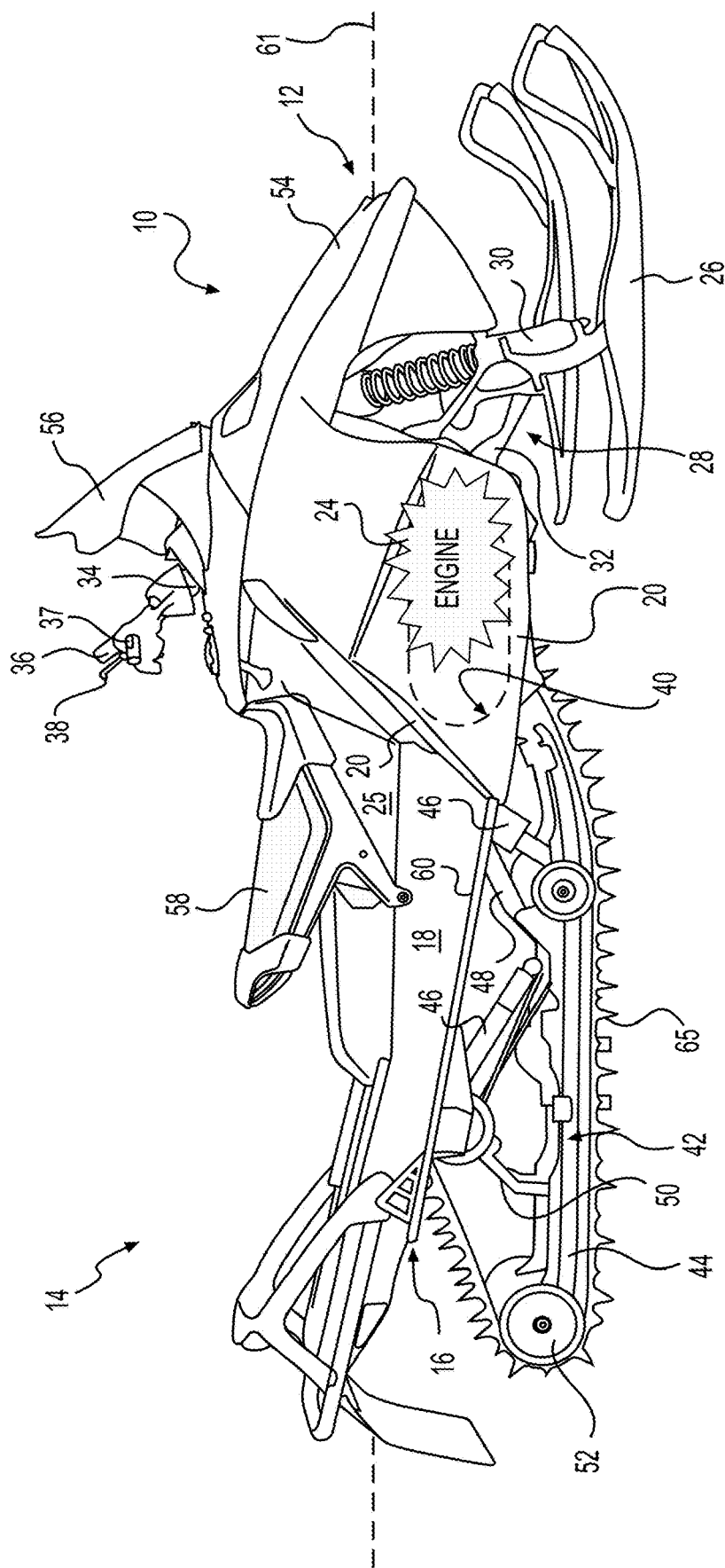
FIG. 1 is a right side elevation view of a snowmobile.

Turning now to FIG. 1, a snowmobile 10 includes a forward end 12 and a rearward end 14 which are defined consistently with a forward travel direction. The snowmobile 10 has a frame 16 that includes a tunnel 18, an engine cradle portion 20 and a front suspension assembly portion 22. The tunnel 18, generally formed of sheet metal bent in an inverted U-shape, extends rearwardly along the longitudinal axis 61 of the snowmobile 10 and is connected at the front to the engine cradle portion 20. An engine 24, shown schematically in FIG. 1, is carried by the engine cradle portion 20 of the frame 16. A fuel tank 25, supported above the tunnel 18, supplies fuel to the engine 24 for its operation.

Two skis 26 are positioned at the forward end 12 of the snowmobile 10 and are attached to the frame 16 through a front suspension assembly 28. The front suspension assembly 28 includes ski legs 30, supporting arms 32 and ball joints (not shown) for operatively connecting the respective skis 26 to a steering column 34.

An endless drive track 65 is positioned at the rear end 14 of the snowmobile 10. The drive track 65 is disposed generally under the tunnel 18, and is operatively connected to the engine 24 through a continuously variable transmission (CVT) 40 (illustrated schematically by broken lines in FIG. 1) and a drive sprocket (not shown). The operation of the engine 24 and the CVT 40 will be described in greater detail below. The endless drive track 65 is driven to run about a rear suspension assembly 42 for propulsion of the snowmobile 10.

The rear suspension assembly 42 includes a pair of slide rails 44 in sliding contact with the endless drive track 65. The rear suspension assembly 42 also includes one or more shock absorbers 46 and suspension arms 48 and 50 to attach the slide rails 44 to the frame 16. One or more idler wheels 52 are also provided in the rear suspension assembly 42.

At the front end 12 of the snowmobile 10, fairings 54 enclose the engine 24 and the CVT 40, thereby providing an external shell that protects the engine 24 and the CVT 40. The fairings 54 include a hood and one or more side panels which can be opened to allow access to the engine 24 and the CVT 40 when this is required, for example, for inspection or maintenance of the engine 24 and/or the CVT 40. A windshield 56, connected to the fairings 54 near the front end 12 of the snowmobile 10, acts as a windscreen to lessen the force of the air on the driver while the snowmobile 10 is moving.

A straddle-type seat 58 is positioned atop the fuel tank 25 and extends rearward from the fairings 54 to accommodate a driver of the snowmobile 10. A rear portion of the seat 58 may include a storage compartment or can be used to accommodate a passenger seat (not indicated). A footrest 60 is positioned on each side of the snowmobile 10 below the seat 58 to accommodate the driver's feet.

The upper end of the steering column 34 is attached to a steering device such as a handlebar 36 which is positioned forward of the seat 58. The handlebar 36 is used to rotate the ski legs 30 and thus the skis 26, in order to steer the vehicle 10.

A throttle operator 37 in the form of a finger-actuated throttle lever 37 is mounted near the left side grip of the handlebar 36. Other types of throttle operators, such as a thumb-actuated throttle lever and a twist grip, are also contemplated. The throttle lever 37 is normally biased, typically by a spring, towards a position furthest away from the handlebar 36. This position of the throttle lever 37 is indicative of a desire for an idle operation of the engine 24 as will be described below. The throttle lever 37 can be pressed towards the handlebar 36 to increase air flow into the engine 24, and to thereby increase the output power of the engine 24 by means of a drive-by-wire (DBW) system. U.S. Provisional Patent Application No. 61/666,443, filed on Jun. 29, 2012, the entirety of which is incorporated herein by reference, provides additional details of drive-by-wire throttle systems in vehicles. A throttle operator position PP is defined as a fraction of its fully activated position and thus varies between 0% (unactivated or idle position) and 100% (fully activated when throttle lever 37 is at its closest position to the handlebar 36). It is contemplated that the snowmobile 10 could not have a DBW system.

A brake operator 38 in the form of a finger-actuated brake lever 38 is mounted near the right side grip of the handlebar 36. The brake lever 38 is connected to a brake disc (not shown) connected to the sprocket in order to brake the sprocket, and thereby the endless track 65 in a manner that will be understood by a worker skilled in the art.

A display cluster 64 (FIG. 3) is provided in front of the handlebars 36 to display information, such as the vehicle speed, engine speed, vehicle mode, temperature and the like, to the driver of the snowmobile 10. The display cluster 64 possibly includes one or more gauges, display screens, indicator lights and sound output devices such as speakers, alarms and the like.

A mode switch 62 (FIG. 3) is provided near or on the handlebar 62. The mode switch 62 is in the form of a toggle switch, but it is contemplated that it could be a push-button switch, knob, lever or other user control implemented into the display cluster 64 or gauges. The mode switch 62 has positions corresponding to an economy mode (ECO), a standard mode (STD) and a sport mode (SPORT), as will be described below in further detail. The mode switch 62 can be toggled sequentially through the positions corresponding to the economy mode, the standard mode, and the sport mode. The driver of the snowmobile 10 indicates a desire to change the mode of operation from a current mode of operation CM to a desired mode of operation DM for the snowmobile 10 by actuating the mode switch 62 to the position corresponding to the desired mode DM. It is contemplated that the modes of operation of the vehicle could be related to an authorization or identification of the driver, for example, as encoded in a key used to the start the vehicle 10. For example, different keys could be associated with different modes, or each key could be authorized to operate the vehicle in one or more modes. It is contemplated that the number and names of operation modes could be different than as described herein.

The engine 24 is an internal combustion engine. The internal construction of the engine 24 may be of any known type and can operate on the two-stroke or four-stroke principle. The engine 24 drives a crankshaft 57 (FIG. 4A) that rotates about a horizontally disposed axis 85 (FIG. 4A) that extends generally transversely to the longitudinal axis 61 of the snowmobile 10. The crankshaft 57 drives the CVT 40, as described in greater detail below, for transmitting torque to the endless drive track 65 for propulsion of the snowmobile 10.

Figure 2A:
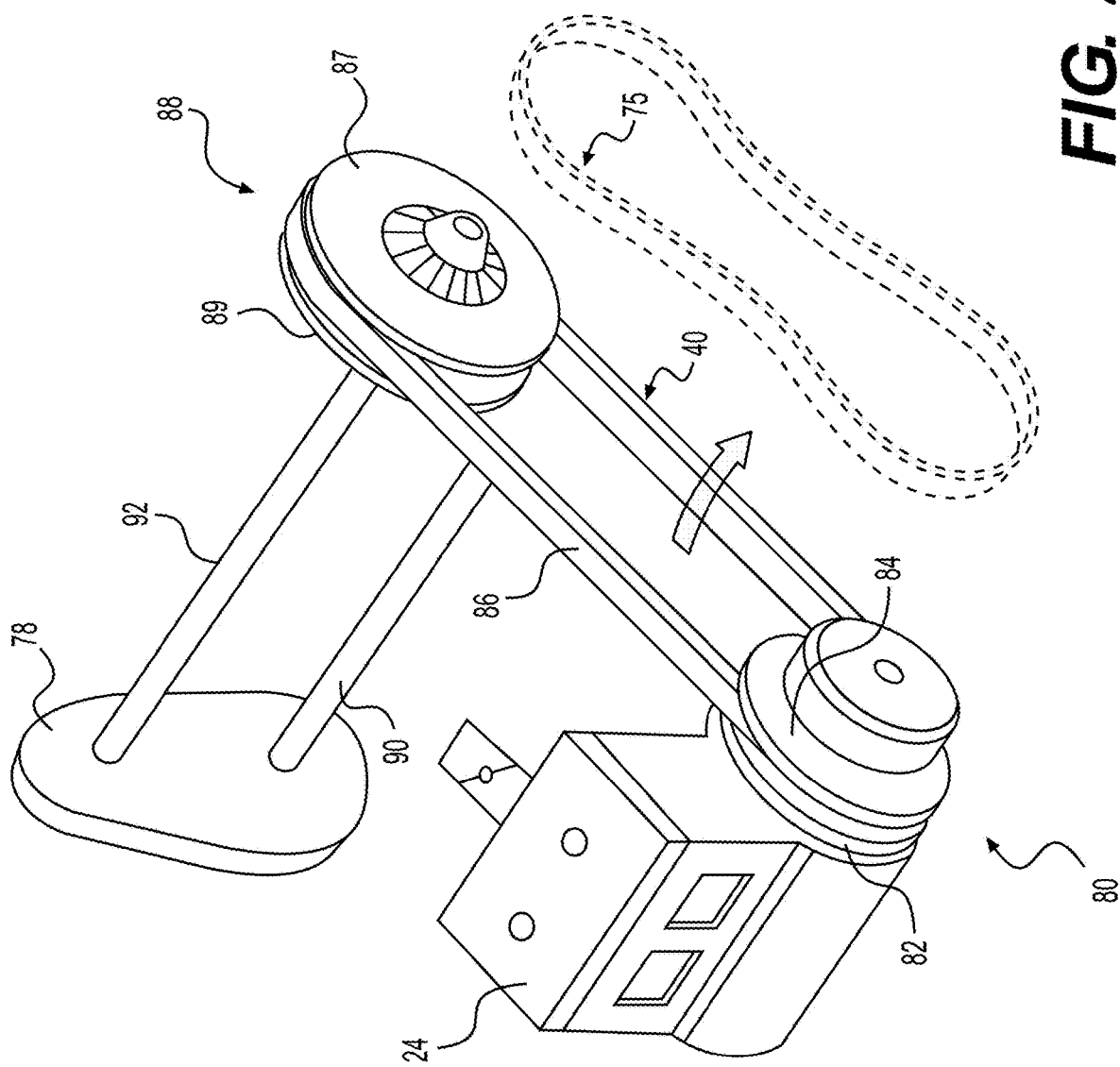
FIG. 2A is a perspective view, taken from a front, left side, of a powertrain of the snowmobile of FIG. 1.

FIG. 2A illustrates schematically a powertrain 75 of the snowmobile 10. The powertrain 75 includes the engine 24, the CVT 40 and a fixed-ratio reduction drive 78. The CVT 40 includes a driving pulley 80 coupled directly to rotate with the crankshaft 57 of the engine 24 and a driven pulley 88 coupled to one end of a transversely mounted jackshaft 92 which is supported on the frame 16 by bearings. As illustrated, the transversely mounted jackshaft 92 traverses the width of the engine 24. The opposite end of the transversely mounted jackshaft 92 is connected to the input member of the reduction drive 78 and the output member of the reduction drive 78 is connected to a drive axle 90 carrying sprocket wheels (not shown) that form a driving connection with the drive track 65. Typically, the input member of the reduction drive 78 consists of a small sprocket connected to the transverse jackshaft 92 and coupled to drive an output member consisting of a larger sprocket connected to the drive axle 90 through a driving chain, all enclosed within the housing of the reduction drive 78.

In this particular example, the driving pulley 80 rotates at the same speed ES as the crankshaft 57 of the engine 24 whereas the speed of rotation of the transverse jackshaft 92 is determined in accordance with the instantaneous ratio of the CVT 40. The drive axle 90 rotates at a lower speed than the transverse jackshaft 92 because of the action of the reduction drive 78. It is contemplated that the driving pulley 80 could be coupled to an engine shaft other than the crankshaft 57, such as an output shaft, a counterbalance shaft, or a power take-off shaft driven by and extending from the engine 24. Similarly, it is contemplated that the driven pulley 88 could be coupled to a shaft other than the transverse jackshaft 92, such as directly to the drive axle 90 or any other shaft operatively connected to the ground engaging element of the vehicle (i.e. the drive track 65 in the case of the snowmobile 10).

The driving pulley 80 of the CVT 40 includes a pair of opposed frusto-conical sheaves, 82 and 84, between which the endless belt member 86 is held. The driving pulley 80 will be described in greater detail below. The driven pulley 88 includes a pair of frusto-conical sheaves, 87 and 89, holding the endless belt member 86 between them.

The gear ratio of the CVT 40 is defined as the ratio of the effective diameter D2 of the driven pulley 88 to the effective diameter D1 of the driving pulley 80. The effective diameters D1, D2 of the pulleys 80, 88 are determined by the radial position of the belt 86 held between the two sheaves, 82 and 84, 87 and 89, of the respective pulleys 80, 88. The radial position of the belt 86 held between two sheaves, 82 and 84, 87 and 89, changes with the separation between the sheaves, 82 and 84, 87 and 89. Since the length of the belt 86 remains constant, there is an inverse relationship between the effective diameters D1, D2 of the driving and driven pulleys 80, 88. When the belt 86 moves radially outwards on the driving pulley 80 (i.e. when the driving pulley sheaves, 82 and 84, move towards each other), thereby increasing the effective diameter D1 of the driving pulley 80, the belt 86 has to move radially inwards on the driven pulley 88 (i.e. the driven pulley sheaves, 87 and 89, are moved away from each other), thereby decreasing effective diameter D2 of the driven pulley 88, and changing the CVT gear ratio.

The driving pulley sheaves 82, 84 are biased away from each other so that when not rotating, the driving pulley sheaves 82, 84 are far apart and the belt 86 is disengaged from the driving pulley 80. The moveable sheave moves in response to changes in engine speed ES. The effective diameters D1, D2 of the pulleys 80, 88 are in inverse relationship. As the crankshaft 57 and the driving pulley sheaves 82, 84 begin to rotate with increasing rotational speeds ES, the separation between the driving pulley sheaves 82, 84 decreases due to the action of a set of centrifugal weights pushing the moveable sheave towards the fixed sheave. At a certain engine speed ES, the driving pulley sheaves 82, 84 engage the belt 86 which in turn begins to rotate the driven pulley sheaves 87, 89. The rotational speed ES (of the crankshaft 57 and driving pulley sheaves 82, 84) at which the driving pulley sheaves 82, 84 engage the belt 86 is referred to as the engagement speed $ES_{engage}$.

For rotational speeds ES greater than the engagement speed $ES_{engage}$, the engine 24 is operatively connected via the CVT 40 to the track 65. For rotational speeds ES less than the engagement speed $ES_{engage}$, the CVT 40 is not engaged and thus the powertrain 75 cannot deliver torque and power from the engine 24 to the track 65. The snowmobile 10 is thus not being driven by the engine 24, and the engine 24 is in idle operation for engine speeds ES less than the engagement speed $ES_{engage}$. Idle operation of the engine 24 enables powering of vehicle systems such as the displays 64, the ECU 200, and the like. The engine 24 can be placed in idle operation by releasing the throttle lever 37 without turning off the engine 24. The engine 24 is typically turned on and off by inserting a key (mechanical and/or electronic) into a key receiver or by the operation of an on/off switch.

The engine 24 transmits torque via the crankshaft 57 to the driving pulley 80 to rotate the driving pulley 80. The separation between the driving pulley sheaves, 82 and 84, and the effective diameter of the driving pulley 80 is controlled by an adjusting mechanism that will be described in greater detail below. The belt 86 is engaged by the sheaves 82, 84 of the driving pulley 80 as described above. The belt 86, in turn, engages the driven pulley 88, rotating the sheaves, 87 and 89, changing the separation therebetween, and the effective diameter D2 of the driven pulley 88 as described above. Torque is thus transferred from the engine 24 to the driving pulley 80, the belt 86, the driven pulley 88 and finally to the drive axle 90.

When the CVT gear ratio is large (low gear), the driving pulley 80 rotates several times for each rotation of the driven pulley 88. This configuration is desirable in certain situations such as, for example, during acceleration of the snowmobile 10, where it is necessary to transfer a large torque to the driving pulley 88, and thereby to the drive axle 90.

When the CVT gear ratio is small (high gear), each rotation of the driving pulley 80 results in multiple rotations of the driven pulley 88. This is useful in certain situations, such as, for example, when the snowmobile 10 is being driven at constant and high speeds.

The engine 24 is an inline, two-cylinder, four-stroke, internal combustion engine. It is however contemplated that the construction of the engine 24 may be of any known type. The engine 24 receives fuel from the fuel tank 25 via a fuel injection system 76 (FIG. 3). The engine 24 receives air from an air intake system 66 (FIG. 2B) via a throttle body 68. The fuel-air mixture in the engine 24 is ignited by an ignition system 74. Engine output power P, torque τ and engine speed ES are determined in part by the fuel-air mixture in the engine 24 and the ignition timing IT. The engine 24 is fluidly connected to a cooling system 284 for cooling the engine 24 during its operation. An engine control unit (ECU) 200 is operatively connected to the engine 24 to control operation of the engine 24 as will be discussed below.

Figure 2B:
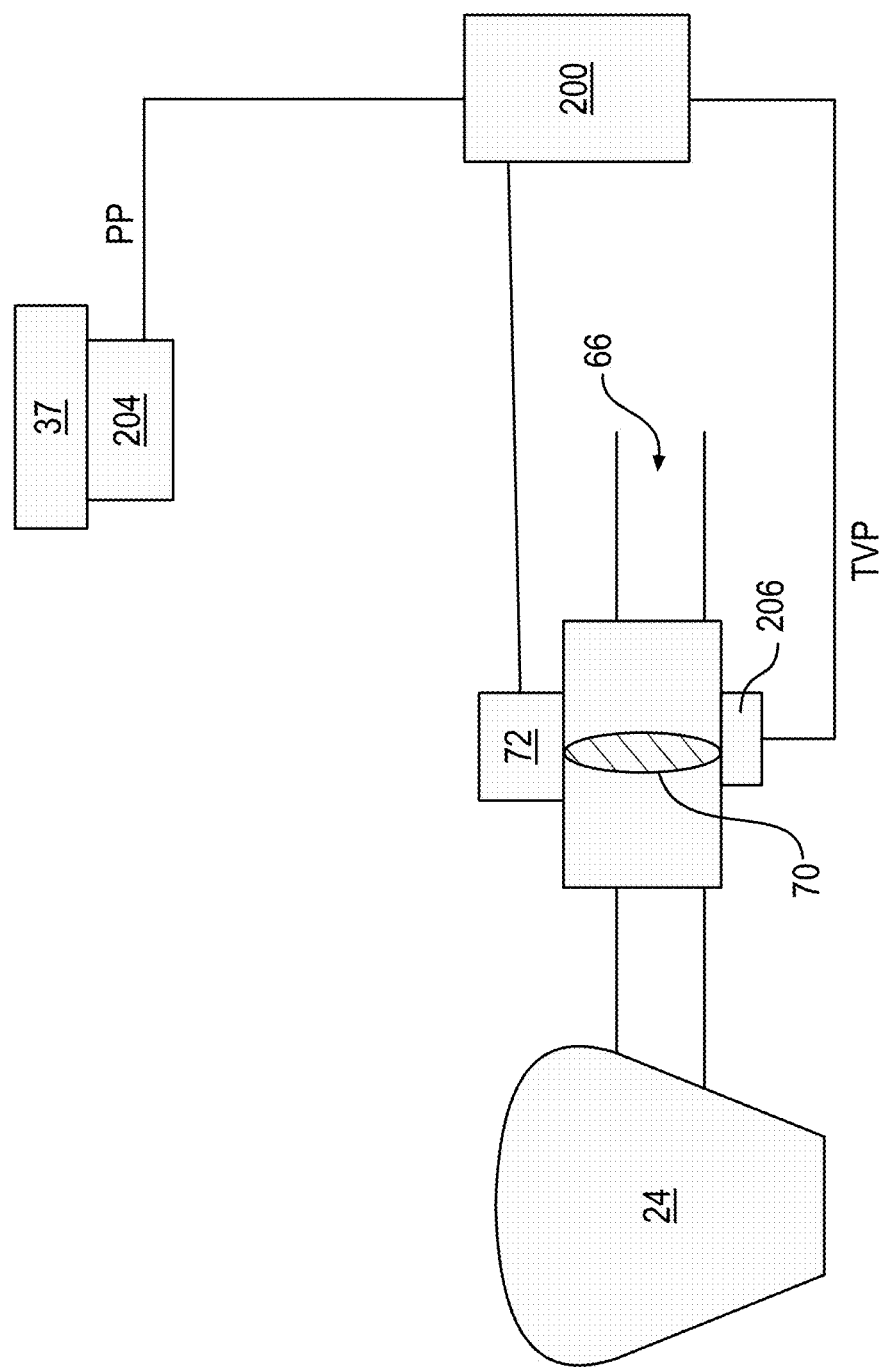
FIG. 2B is a schematic illustration of a throttle control system of the snowmobile of FIG. 1.
Figure 3:
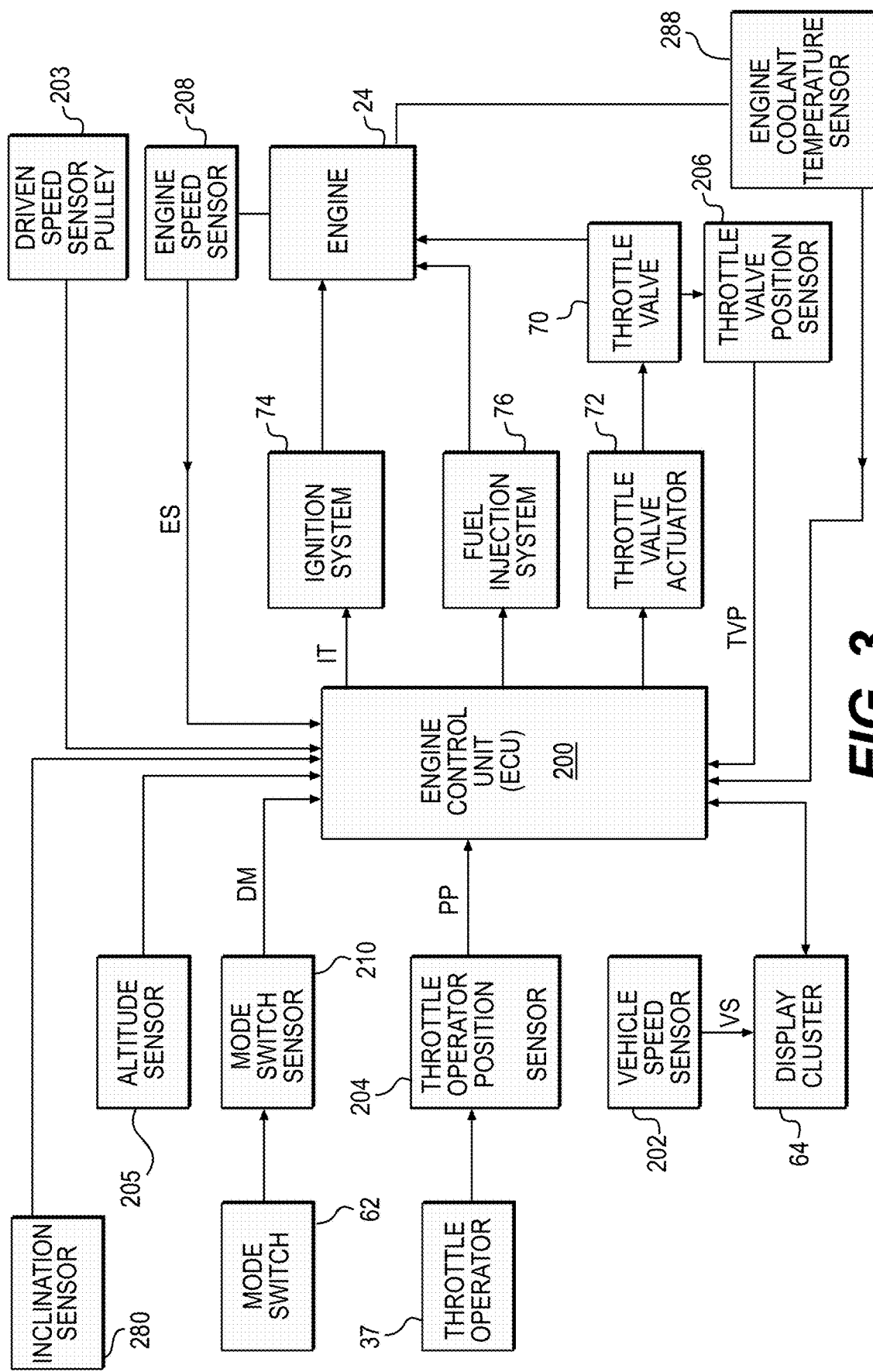
FIG. 3 is a schematic illustration of elements of an engine control unit of the snowmobile of FIG. 1.

With reference to FIG. 2B, the throttle body 68 comprises a throttle valve 70 that regulates the amount of air flowing through the throttle body 68 into the engine 24. The throttle valve 70 is a butterfly valve comprising a circular disc mounted inside the tubular throttle body 68 that rotates about a rod passing through a diameter of the disc. The passage of air through the tubular throttle body 68 is obstructed by varying amounts as the disc rotates about the rod. The throttle valve 70 is in a fully open position (minimal obstruction of air flow) when the circular surface of the disc is at its minimum angle with respect to the central axis of the tubular throttle body 68, and in a fully closed position (maximal obstruction of air flow) when the circular surface of the disc is at its maximum angle with respect to the central axis of the tubular throttle body 68. A throttle valve actuator 72, in the form of an electric motor, is operatively connected to the throttle plate to change the position of the throttle plate and thereby adjust the opening of the throttle valve 70. A throttle valve position TVP can be defined in terms of a degree of opening of the throttle valve 70. The throttle valve position TVP is defined as a fraction of its fully open position and thus varies from 0% (fully closed) to 100% (fully open). A throttle valve sensor 206 is connected to the throttle valve 70 to sense the throttle valve position TVP. The throttle valve actuator 72 positions the throttle valve 70 based at least in part on a position PP of the throttle lever 37 of the snowmobile 10. As mentioned above, the snowmobile 10 has a drive-by-wire (DBW) system in which the throttle valve 70 is controlled electronically instead of having a mechanical linkage between the throttle lever 37 and the throttle valve 70. The position PP of the throttle lever 37 is monitored by a throttle operator position sensor 204. The actuator 72 is controlled based in part on signals received from the ECU 200, as described below.

With reference to FIGS. 2B and 3, the ECU 200 is in electronic communication with various sensors from which it receives signals. The ECU 200 uses these signals to control the operation of the throttle valve actuator 72, the ignition system 74, and the fuel injection system 76 in the case of a fuel injected engine, in order to control the engine 24. The methods by which the ECU 200 controls the engine 24 will be described in more detail below.

As it would be understood by those skilled in the art, not every sensor or component illustrated in FIG. 3 is required to achieve aspects of the present technology. As would also be understood by those skilled in the art, depending on the particular aspect of the technology, some of the sensors and components could be omitted, some of the sensors and components could be substituted by other types of sensors and components, and two or more sensors could be combined in a single sensor that can be used to perform multiple functions without departing from the scope of the present technology.

The throttle operator position sensor 204 senses a position PP of the throttle operator 37 (finger or thumb actuated throttle lever 37 in the illustrated implementation of the snowmobile 10) and sends a signal representative of the throttle operator position PP to the ECU 200. Depending on the type of throttle operator, the throttle operator position sensor 204 is generally disposed in proximity to the throttle operator 37 and senses the movement of the throttle operator 37 or the linear displacement of a cable connected to the throttle operator 37.

The ECU 200 sends a signal to the throttle valve actuator 72 to adjust the position TVP, and thereby the opening, of the throttle valve 70 inside the throttle body 68. The throttle valve position TVP is adjusted based in part on the throttle operator position PP as well as on other factors such as the ignition timing IT, required output power P and torque T, the current mode of operation CM, and the like.

The throttle valve position sensor 206 senses the position (i.e. the degree of opening) of the throttle valve 70 and sends a signal representative of the position TVP of the throttle valve 70 to the ECU 200. The throttle valve position sensor 206 acts as a feedback to the ECU 200 since the ECU 200 uses the signal received from the throttle valve position sensor 206 to determine if the throttle valve actuator 214 has moved the throttle valve 37 to the desired position and can make adjustments accordingly. The throttle valve position sensor 206 can be any suitable type of sensor such as a rheostat, hall-effect sensor, potentiometer, and the like. Depending on the type of throttle valve actuator 72 being used, a separate throttle valve position sensor 206 may not be necessary. For example, a separate throttle valve position sensor 206 would not be required if the throttle valve actuator 72 is a servo motor since servo motors integrate their own feedback circuit that corrects the position of the motor and thus have an integrated throttle valve position sensor 206.

An engine speed sensor 208 senses a speed of rotation ES of the engine 24 and sends a signal representative of the speed of rotation ES of the engine 24 to the ECU 200. The engine speed sensor 208 is a hall-effect type sensor coupled to a trigger wheel on the engine output shaft. It is contemplated that the engine speed sensor 202 could be coupled to any rotating shaft of the engine 24, such as the crankshaft. The rotation speed ES of the engine 24 can be used by the ECU 200 to calculate the engine torque ti and the power output P of the engine 24.

A mode switch sensor 210 senses a position or a movement of the mode switch 62 and sends a signal to the ECU 200 indicative of the desired mode of operation DM (also referred to herein as the selected mode of operation of the vehicle). In some implementations, the mode switch sensor 210 is configured to sense a position of the mode switch 62 and the ECU 200 determines the corresponding desired mode of operation DM from the signal received from the mode switch sensor 210. In some implementations, the mode switch sensor 210 is configured to sense a movement of the mode switch 62, including the number of steps moved (one or two steps in the illustrated implementation) and a direction of movement ("up" or "down"). The mode switch sensor 210 sends a signal to the ECU 200 indicative of the movement and the ECU 200 determines the desired mode of operation DM based on the current mode of operation CM and the information received about the movement of the mode switch 62.

A vehicle speed sensor 202 senses the speed VS of the snowmobile 10 and sends a signal representative of the speed VS of the snowmobile 10 to the cluster 64. It is contemplated that the vehicle speed sensor 202 could also send a signal representative of the speed VS of the snowmobile 10 to the ECU 200. The vehicle speed sensor 202 is a hall-effect sensor coupled to a trigger wheel on a driveshaft, such as the drive axle 90 so as to sense a rotational speed thereof. It is contemplated that the vehicle speed sensor 202 could sense a speed of any shaft driven by the driven pulley 88 (i.e. any shaft connected between the driven pulley 88 and the track 65), including shafts inside the reduction drive 78, to determine the speed of the snowmobile 10. It is contemplated that any suitable type of vehicle speed sensor 202 could be used. Alternatively, the vehicle speed sensor 202 could include a global positioning system (GPS unit). By using information from the GPS unit, the speed of the vehicle 10 can be determined by calculating a change in position of the vehicle 10 over a period of time which is normally a function of the GPS unit.

A driven pulley speed sensor 203 senses the speed $N_2$ of the driven pulley 88 and sends a signal representative of the speed $N_2$ to the ECU 200. The driven pulley speed sensor 203 is a hall-effect sensor coupled to the jackshaft 92 so as to sense a rotational speed thereof.

An altitude sensor 205 provided on the vehicle 10 determine the altitude at which the vehicle 10 is operating and sends a signal to the ECU. The altitude sensor in the illustrated implementation is an air pressure sensor (or barometer) that detects the atmospheric pressure in the vicinity of the vehicle 10 and determines the altitude based on the detected atmospheric pressure. It is contemplated that the sensor 205 is an altimeter. It is contemplated that the altitude sensor 205 could be part of the GPS unit mentioned above.

An inclination sensor 280 is provided on the vehicle 10 to sense an inclination of the ground that the vehicle is operating on. It is contemplated that the inclination sensor 280 could be part of the GPS unit mentioned above.

The ECU 200 is connected to the ignition system 74 to control ignition of the fuel-air mixture in the combustion chamber of the engine 24. For example, the ECU 200 controls the ignition timing IT based partly on the throttle valve position TVP, the throttle operator position PP, and/or engine speed ES. The ECU 200 is also connected to the fuel injection system 76 to control fuel injection into the engine 24. The ECU is connected to an engine coolant temperature sensor 288 for monitoring the engine coolant temperature flowing through the engine cooling system 284, and thereby monitoring the operating temperature $T_E$ of the engine 24.

The ECU 200 is connected to the display cluster 64 to control display of information thereon. The ECU 200 sends signals to the display cluster 64 to display information regarding engine and vehicle speed, and mode selection.

It is contemplated that the ECU 200 could be separated into multiple units each having one or more of the functions described above and further below.

The ECU 200 controls operation of the engine 24 based at least in part on the signals received from the sensors 202, 203, 204, 205, 206, 208, 210 and depending on the specific control scheme or map being used by the ECU 200. The control maps provide information related to various parameters (such as throttle valve position TVP, throttle operator position PP, fuel injection, ignition timing IT, engine torque, power output, etc.) needed for operation of the engine 24. For example, a control map could provide information regarding the variation of throttle valve position and engine speed for achieving a particular power output or engine torque. The ECU 200 may also use algorithms, in addition to the control maps, to determine some of the parameters.

The snowmobile 10 can be operated in different modes of operation (sport, standard and economy in the illustrated implementation) as mentioned above. Some of the control maps used by the ECU 200 are specific to each mode of operation and specify the variation of engine parameters for operation in that mode.

Figure 2C:
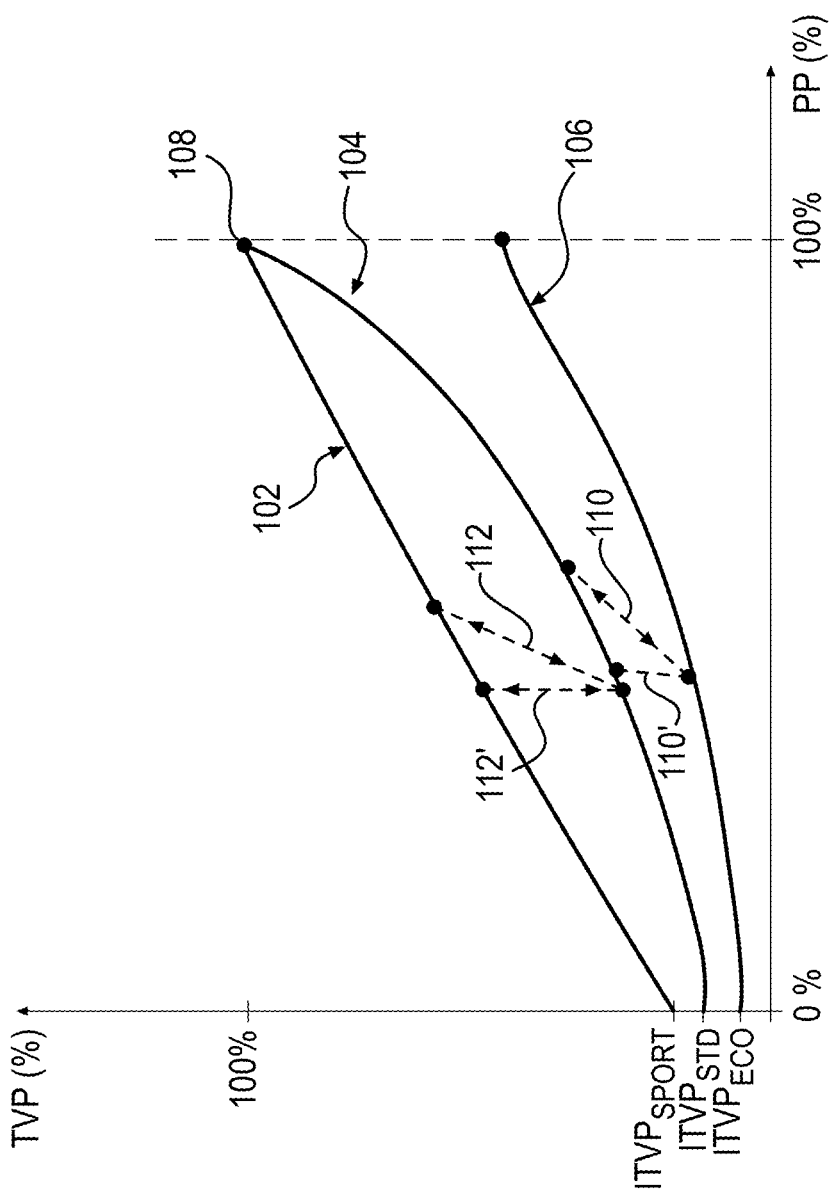
FIG. 2C is an illustration of the response of a throttle valve to a position of a throttle operator in different modes of operation of the snowmobile of FIG. 1.

With reference to FIG. 2C, it can be seen that the throttle response (i.e. the throttle valve position TVP as a function of throttle operator position PP) is different for different modes. As mentioned above, the throttle valve position TVP is defined as a fraction of its fully open position and thus varies from 0% (fully closed) to 100% (fully open). The throttle operator position PP is also defined as a fraction of its fully activated position and thus varies between 0% (unactivated or idle) and 100% (fully activated).

As the throttle operator position PP increases from 0% to 100%, the corresponding throttle valve position TVP for each mode increases from a minimum value for that mode to a maximum value for that mode. The minimum throttle valve position TVP corresponding to the 0% throttle operator position PP is greater than zero for all three modes. It is contemplated that the throttle valve position TVP corresponding to the 0% throttle operator position PP could be zero for all three modes. The minimum throttle valve position TVP corresponds to the idle throttle valve position ITVP for that mode and is set at a value greater than zero to enable idle operation in that mode.

As can be seen, for any given throttle operator position PP, the corresponding economy mode throttle valve position TVP is lower than the corresponding sport and standard mode throttle valve positions TVP. Furthermore, for any given throttle operator position PP other than 100%, the sport mode throttle valve position TVP is greater than the corresponding standard mode throttle valve position TVP. At the 100% throttle operator position PP the sport and standard mode throttle valve positions TVP are equal.

In the illustrated implementation, the maximum throttle valve position TVP in the sport and standard modes is set to be at its fully open position (i.e. at 100%), while in the economy mode, the maximum throttle valve position TVP is limited to 50% of its fully open position. It is contemplated that the maximum throttle valve position TVP of the standard mode could be less than that of the sport mode such that each of the three modes has a different maximum throttle valve position TVP. It is also contemplated that the maximum throttle valve position TVP of the standard mode could be the same as that of the economy mode. In the illustrated implementation, for each of the three modes, the maximum throttle valve position TVP is obtained when the throttle pedal 37 is positioned at its maximum throttle position PP of a 100%. It is contemplated that the maximum throttle valve position TVP could be obtained for a throttle operator position which is less than 100%.

The engine 24 of the snowmobile 10 is capable of delivering a certain maximum output power based on its capacity as will be understood by a worker skilled in the art. The power P delivered by the engine 24 at any given instant is a function of, amongst other parameters, the throttle valve position TVP, the ignition timing IT and the fuel injection. The ECU 200 controls operation of the engine 24 such that the output power P delivered by the engine 24 also depends on the current mode of operation CM. For example, in the economy mode, the output power P delivered by the engine 24 is limited to a maximum value that is approximately 50% of the maximum output power available from the engine 24.

It is also contemplated that the vehicle speed could be limited in one of the modes, for example, the vehicle speed could be limited in the economy mode, to increase fuel efficiency.

Figure 4A:
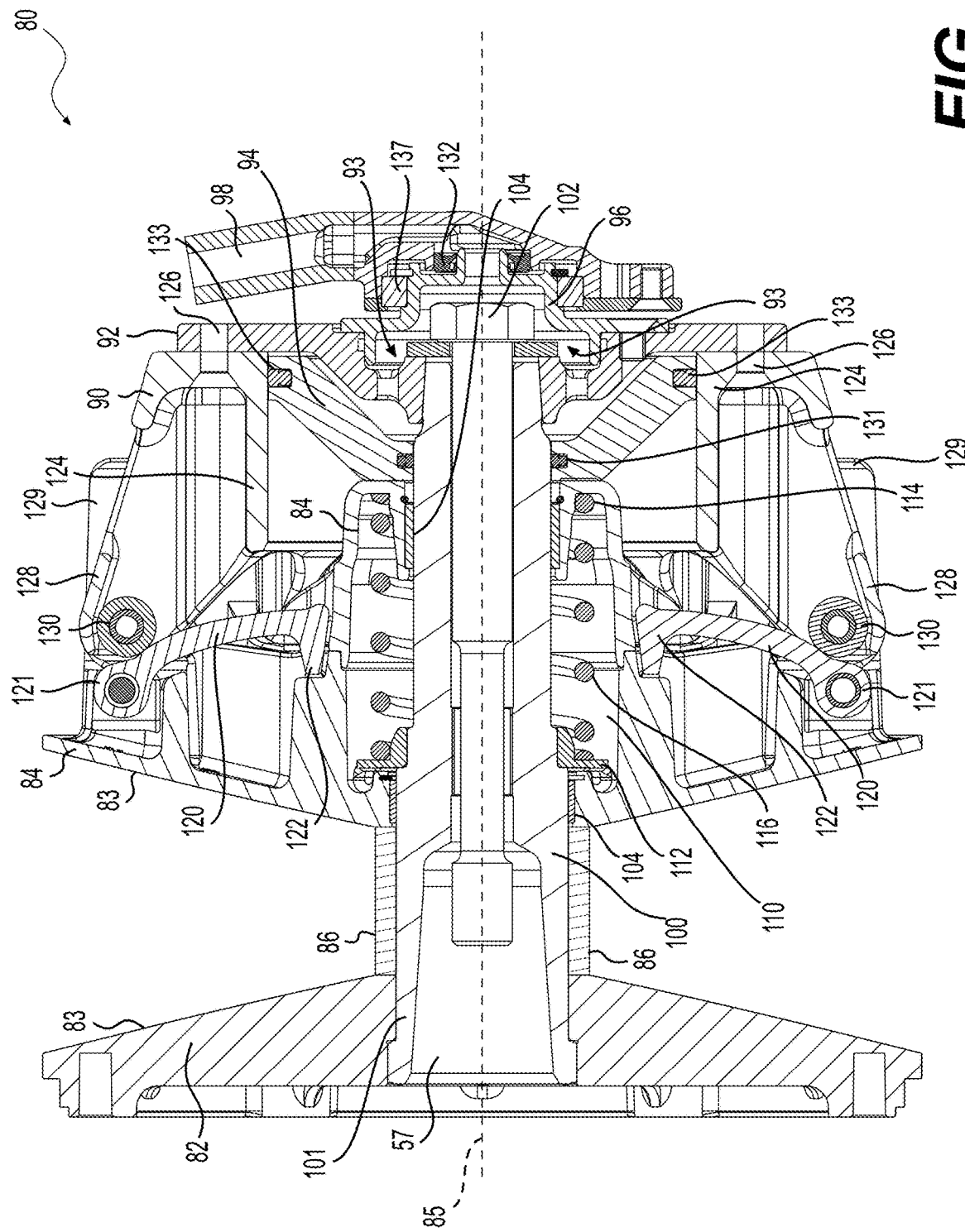
FIG. 4A is a cross-sectional view of a driving pulley of a continuously variable transmission (CVT) of the powertrain of FIG. 2, with the driving pulley in an inactive configuration.
Figure 4B:
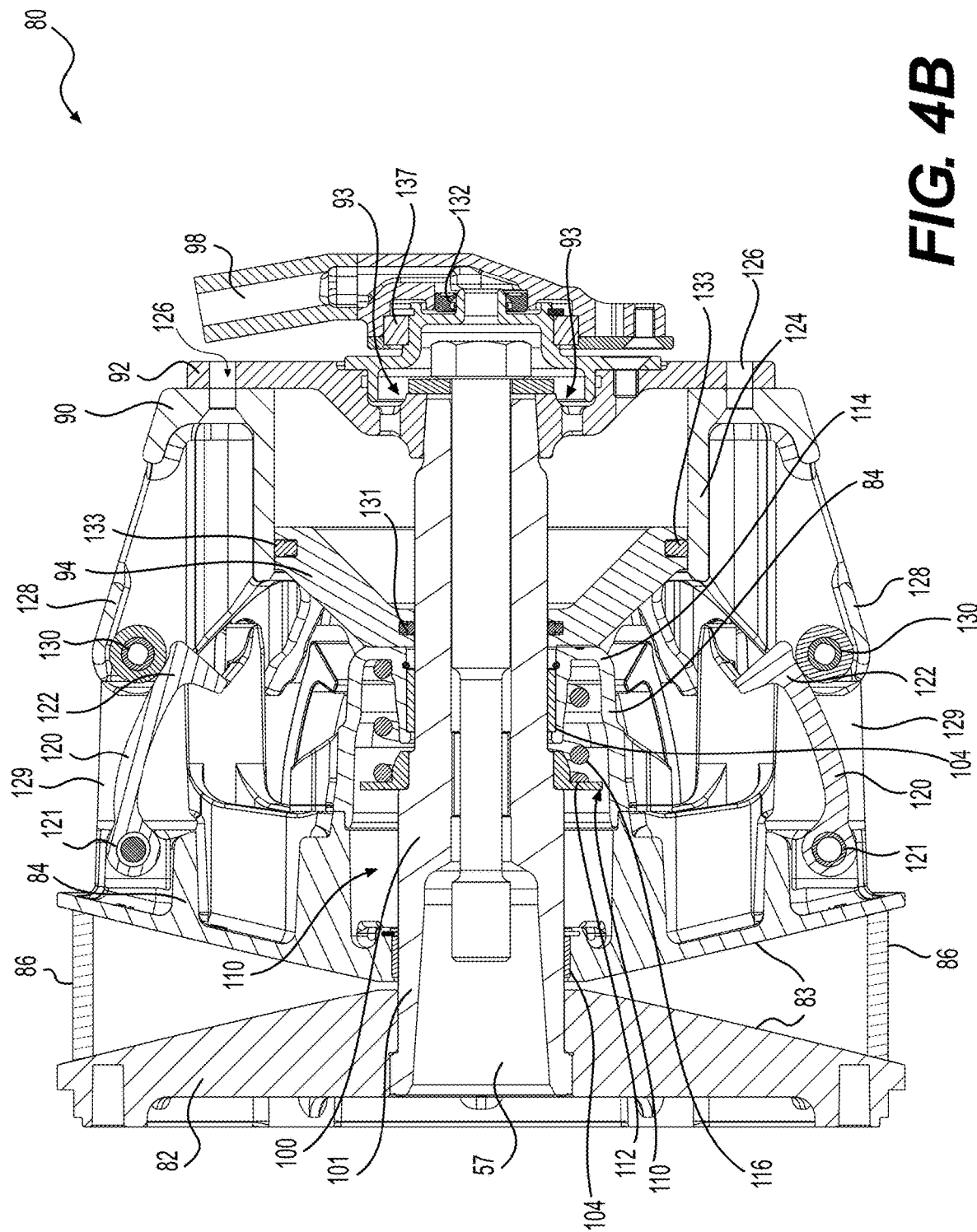
FIG. 4B is a cross-sectional view of the driving pulley of FIG. 4A in an active configuration.

Turning now to FIGS. 4A and 4B, the driving pulley 80 will be described in more detail.

As discussed above, the driving pulley 80 includes a pair of sheaves 82 and 84, both of which rotate together with the crankshaft 57 about a rotation axis 85 of the driving pulley 80. The term "axial direction", as used herein in relation to the driving pulley 80, refers to a direction parallel to the rotation axis 85.

The inner and outer sheaves 82, 84 each have a belt-engaging surface 83. The belt 86 is held between the belt-engaging surface 83 of the driving sheaves 82, 84. The inner sheave 82, disposed between the outer sheave 84 and the engine 24, is fixed in the axial direction, and is therefore referred to as the fixed sheave 82. The outer sheave 84 can move toward or away from the fixed sheave 82 in the axial direction in order to change the drive ratio of the CVT 40, and is therefore referred to as the movable sheave 84. It is contemplated that both sheaves 82, 84 could be moveable in the axial direction.

The sheaves 82, 84 of the driving pulley 80 are mounted on a driving shaft 100 which is rotationally coupled to the crankshaft 57. A portion 101 of the driving shaft 100 is taper-fitted on the end of the crankshaft 57. A bolt 102 is inserted into the driving shaft 100 from an end opposite the portion 101 and screwed into the end of the crankshaft 57 to retain the driving shaft 100 on the crankshaft 57. It is contemplated that the driving shaft 100 could be rotationally coupled to the crankshaft 57 in other known manners. For example, the driving shaft 100 could engage the crankshaft 57 via splines.

The fixed sheave 82 is press-fit on the inner end of the driving shaft 100 so as to be axially fixed and to rotate therewith.

The moveable sheave 84 is mounted on the driving shaft 100 axially outwards of the fixed sheave 82. The moveable sheave 84 is mounted on the driving shaft 100 on bearing sleeves 104 so as to be slidable in the axial direction.

An annular spring chamber 110, coaxial with the driving shaft 100, is defined between the moveable sheave 84 and the driving shaft 100. A helical compression spring 116 is disposed inside the spring chamber 110, coaxial with the driving shaft 100. A flange 112 extending radially outwards from the outer surface of the driving shaft 100 into the spring chamber 110 forms a spring stop. The spring 116 is held in the spring chamber 110 between the axially fixed spring stop 112 and an axially moveable outer wall 114 formed by a portion of the moveable sheave 84. This arrangement of the spring 116 biases the movable sheave 84 away from the fixed sheave 82.

It is contemplated that the spring 116 could be held between a portion of the fixed sheave 82 and a portion of the moveable sheave 84, or an element fixedly connected to the slidably moveable sheave 84. It is also contemplated that the spring 116 could be held between a portion of the moveable sheave 84 and an axially fixed portion of the driving pulley 80, other than the flange 112, as long as the axially fixed portion is disposed axially inward of the portion of moveable sheave 84.

A number of centrifugal weights 120 are mounted on the outer surface of the moveable sheave 84. In the illustrated implementation, the centrifugal weights are in the form of flyweights or levers 120 having one end 121 attached to the outer surface of the moveable sheave 84, and the other end 122 being free to pivot away from the moveable sheave 84. When the moveable sheave 84 is at rest, the free end 122 of the centrifugal levers 120 rests against its outer surface. As the rotational speed of the moveable sheave 84 increases, the free end 122 pivots away from the moveable sheave 84 and radially outwards with respect to the driving shaft 100.

A spider 90 and coverplate 92 are mounted on the driving shaft 100, axially outward of the moveable sheave 84, so as to rotate with the driving shaft 100. The coverplate 92 is fixed to the driving shaft 100 by the bolt 102 that retains the driving shaft 100 to the crankshaft 57. The spider 90 is fixed to the coverplate 92 by bolts inserted into holes 126 near its outer periphery. The spider 90 and the coverplate 92 thus rotate with the driving shaft 100.

The spider 90 has a cylindrical hub 124 that extends coaxially around the driving shaft 100, and is spaced therefrom. The spider 90 has six pairs of flanges 128 extending inwards towards the moveable sheave 84. The six pairs of flanges 128 are radially distributed along the outer periphery. Each pair of flanges 128 has a roller 130 mounted rotatably between the ends thereof. Each roller 130 is in contact with a corresponding one of the centrifugal levers 120 of the moveable sheave 84. The flange pairs 128 also engage complementary flanges 129 of the moveable sheave 84 so that the moveable sheave 84 rotates with the spider 90, and therefore with the driving shaft 100, about the axis 85. Each complementary flange 129 of the moveable sheave 84 is received in the space between adjacent flange pairs 128 of the spider 90.

The spider 90 is made of aluminum. It is contemplated that the spider 90 could be made of other suitable materials. The spider 90 has a plurality of apertures 140 formed radially outwards of the hub 124 and between the flange pairs 128. The apertures 140 serve to reduce weight. It is contemplated that the apertures 140 could be omitted.

The coverplate 92 is made of aluminum. It is contemplated that the coverplate 92 could be made of other suitable materials. A plurality of cavities 138 are formed in the surface of the coverplate 92 facing away from the moveable sheave 84. The cavities 138 are formed for the purpose of the weight reduction. It is contemplated that the cavities 138 could be omitted.

At low engine operational speeds (RPM), the fixed sheave 82 and the moveable sheave 84 of the driving pulley 80 are positioned as illustrated in FIG. 4A. At high engine RPMs, the sheaves 82, 84 are positioned as shown in FIG. 4B. The centrifugal weights 120, which help to make this change in configuration, form part of the adjustment mechanism for adjusting the CVT gear ratio.

With reference to FIG. 4A, when the driving shaft 100, and thus the moveable sheave 84 and spider 90 are at rest, the moveable sheave 84 is at its outermost position on the driving shaft 100 and at maximum separation with respect to the fixed sheave 82. In this configuration, the rollers 130 of the spider 90 are in contact with the levers 120 near the end 121 attached to the moveable sheave 184.

As the moveable sheave 84 rotates faster, the free end 122 of the levers 120 extend outwards pushing against the rollers 130, and pushing the moveable sheave 84 away from the spider 90 towards the fixed sheave 82. The point of contact of the lever 120 with the roller 130 moves from the end 121 attached to the moveable sheave 84 towards the free end 122 of the lever 120.

With reference to FIG. 4B, when the moveable sheave 84 is at its innermost position on the driving shaft 100, and at its closest position to the fixed sheave 82, the free ends 122 of the levers 120 are in contact with the rollers 130 of the spider 90. This configuration of the driving pulley 80 is achieved at high rotational speeds of the driving shaft 100.

It is contemplated that the centrifugal weights 120 could be attached to the spider 90 so as to be in contact with the moveable sheave 90, and to push the moveable sheave 84 away from the spider 90 with increasing rotational speed of the spider 90. It is also contemplated that the centrifugal weights could be in the form of roller weights that roll radially outwards with increasing rotational speed of the driving pulley 80. In such an implementation, surfaces in contact with the roller weights are sloped such that the roller weights can push the moveable sheave away from the spider 90.

When the moveable sheave 84 is pushed towards the fixed sheave 82, the compressed spring 116 exerts a force on the moveable sheave 84 to bias it away from the fixed sheave 82, i.e. in a direction opposite to the force exerted on the moveable sheave 84 due to the centrifugal weights 120. The balancing of these opposing forces, partly determines the axial position of the moveable sheave 84. Thus, the centrifugal weights 120 form the mechanical part of the adjustment mechanism for the CVT gear ratio.

A piston 94, is slidably mounted on the driving shaft 100, axially inwards of the coverplate 92, and inside the cylindrical hub 124 of the spider 90. The piston 94 is sealed against the outer surface of the driving shaft 100 by a seal 131 received in a groove formed in the inner cylindrical surface of the piston 94. The piston 94 is sealed against the inner surface of the cylindrical hub 124 by a seal 133 received in a groove formed in the outer cylindrical surface of the piston 94. The cylindrical hub 124 thus forms a cylinder for the piston 94. For simplicity, the cylindrical hub 124 will be referred to hereinafter as the cylinder 124. The piston 94 is moved away from the coverplate 92 by filling the space between the piston 94 and the coverplate 92 with pressurized air as will be described below.

In this implementation, the stationary moveable sheave 84 (i.e. moveable sheave 84 in its outermost axial position) abuts the piston 94 when it is not actuated, as shown in the configuration of FIG. 4A. It is contemplated that the stationary moveable sheave 84 could be spaced from the piston 94 in its unactuated configuration. It is also contemplated that the piston 94 could be attached to the moveable sheave 84, so as to slide and rotate with the moveable sheave 84. It is contemplated that the piston 94 could be disposed in a cylinder that does not form part of the spider 90. It is also contemplated that the piston 94 could have a different shape than as shown herein. It is contemplated that a plurality of pistons, with a corresponding number of cylinders, could be provided to apply force on the moveable sheave 84.

A connector 96 mounted on the coverplate 92 connects an air conduit 98 to the interior of the cylinder 124 via air passages 93 formed in the coverplate 92. The connector 96 rotates with the coverplate 92 while the air conduit 98 is stationary. Bearings 137 are inserted between the stationary air conduit 98 and the connector 96. The connector 96 is rotatably sealed against the stationary air conduit 98 via lip seals 132. When pressurized air is fed through the air conduit 98 to the cylinder 124, the piston 94 slides away from the coverplate 92 pushing the moveable sheave 84 towards the fixed sheave 82 and increasing the effective diameter of the driving pulley 80. Thus, the force exerted on the moveable sheave 84 by the piston 94 is in the same direction as that exerted on the moveable sheave 84 due to the centrifugal weight mechanism.

As explained above, in general, a higher engine RPM causes faster rotation of the driving pulley 80, increasing the force exerted on the moveable sheave 84 due to the centrifugal weights 120, resulting in a larger effective diameter for the driving pulley 80 (i.e. a smaller effective diameter for the driven pulley 88) and a lower gear ratio for the CVT 40. Thus, the gear ratio of the CVT is determined by the operation speed of the engine 24.

The pneumatically actuated piston 94 modifies the response curve of the driving pulley 80. The driving pulley 80 achieves a larger effective diameter for a given engine RPM when the centrifugal weight mechanism is assisted by the pneumatically actuated piston 94 than when the pneumatic piston 94 is not actuated. The pneumatically actuated piston 94 effectively shifts the snowmobile 10 into a higher gear with a smaller engine RPM than would be possible with a CVT 40 controlled solely by mechanical means (i.e. centrifugal weights 120). When the pressure is released so that the piston 94 is no longer actuated, the spring 116 returns the moveable sheave 84 to its initial position so that the CVT 40 returns to its purely mechanical characteristics with the effective diameter of the driving pulley 80, and thus the CVT gear ratio, being determined solely by the centrifugal weights 120.

Thus, the CVT 40 is fully operational with and without the pneumatic piston 94 being actuated. The pneumatic piston 94 permits the CVT gear ratio to be controlled independently of the engine RPM. For example, the CVT gear ratio can be adjusted based on consideration of factors such as, torque required by the drive axle 90, fuel consumption, driver comfort, or the like. The pneumatic pressure actuating the piston 94 can also be adjusted to achieve the response curve desired. For example, the CVT 40 can be configured to maximize fuel economy, or performance, or to optimize both. The pneumatically actuated piston 94 can also be used to simulate the response of a multi-gear transmission. Several methods of pneumatically controlling the CVT 40 will be described below in further detail.

An electrical compressor 320 (FIG. 5) disposed elsewhere on the snowmobile 10 is used to provide pressurized air for actuating the piston 94. The compressor 320 includes an air-water separator to help prevent or minimize moisture inside the CVT 40. It is contemplated that a mechanical compressor could be used instead. It is contemplated that the compressor 320 could be any suitable compressor that is capable of achieving the requisite air pressure for actuation of the piston 94. It is also contemplated that the compressor 320 could be powered by an engine other than the engine 24, a motor or battery as appropriate.

The air pressure applied to the piston 94 and the resultant piston force that fully converges the moveable and fixed sheaves 82, 84 toward each other is much smaller for the CVT 40 of the implementation illustrated in FIGS. 4A and 4B, than for a CVT in which the gear ratio is solely pneumatically controlled. The size of the pump or compressor 320 required to produce this piston force is much smaller than one required for a fully pneumatically-controlled CVT, resulting in energy and space savings for the snowmobile 10.

An accumulator 322 (FIG. 5), serving as a reservoir of compressed air, is installed between the pump 220 and the cylinder 124 in order to ensure a short response time for actuation of the piston 94 under all operating conditions, and to limit pressure fluctuations.

It is also contemplated that pressurized gas cartridges could be used instead of the compressor 320 and accumulator 322 to provide pressurized air for actuation of the piston 94.

The actuation of the piston 94 is controlled automatically based on parameters such the vehicle speed, engine rotation speed (RPM), torque required, fuel reserve and the like. Different methods of controlling the CVT 40 have been described below.

It is contemplated that the actuation of the piston 94 could additionally be controlled manually by the operator of the snowmobile 10. For example, a switch, such as a button switch, could be provided to switch the actuation on or off. Alternatively, a continuously adjustable knob could be provided to allow the driver of the snowmobile to set the amount of force being exerted by the piston 94.

Figure 5:
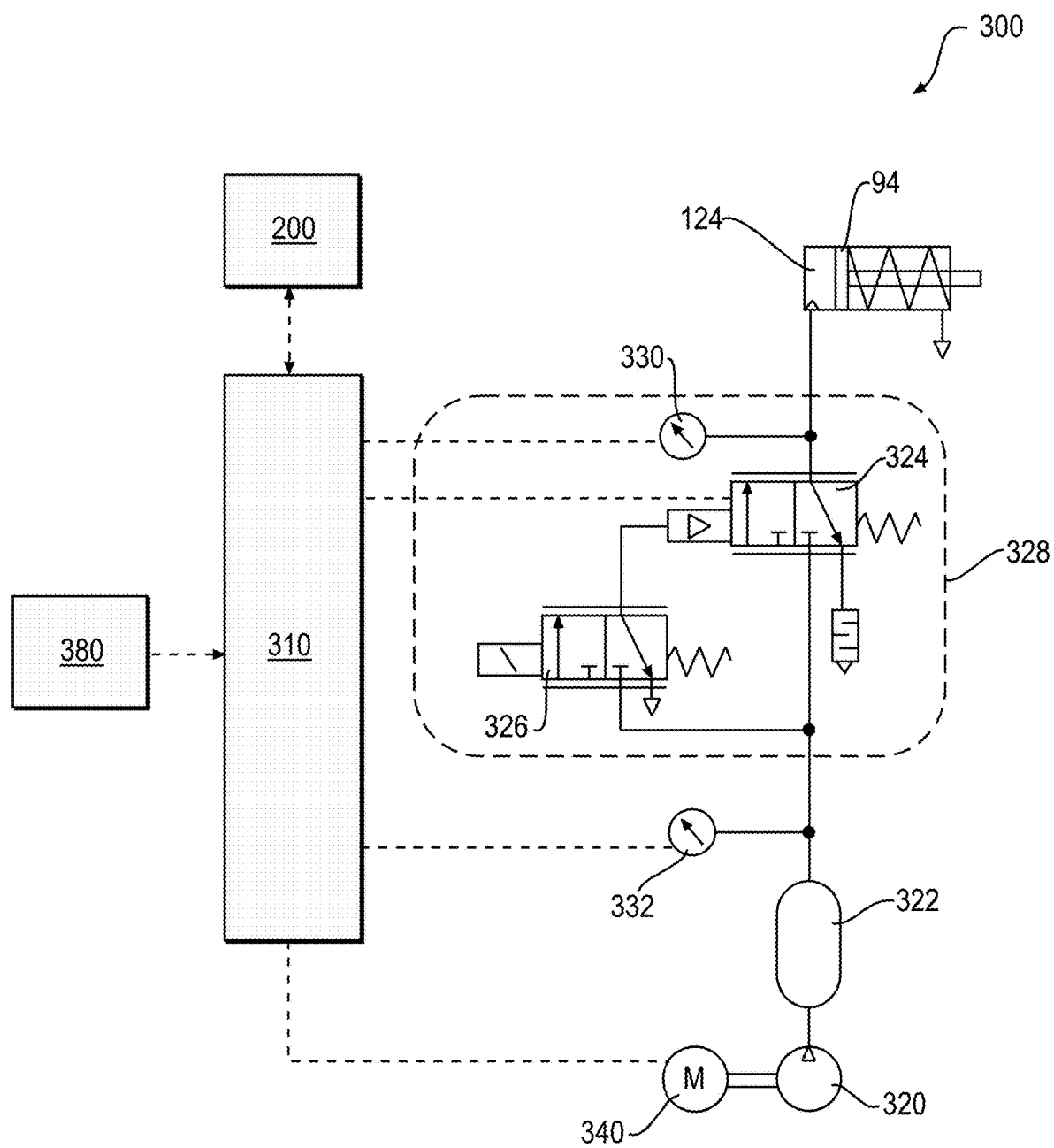
FIG. 5 is schematic illustration of a pneumatic control system for the CVT of the powertrain of FIG. 2.

With reference to FIG. 5, the pneumatic system 300 for delivering pressurized air to the piston 94, and the pneumatic control unit (PCU) 310 for automatically controlling pneumatic actuation of the piston 94 will now be discussed in more detail.

The pneumatic system 300 includes a compressor 320, an electric motor 340, an accumulator 322, a pressure regulation unit 328 including an air inlet valve 324, an air outlet valve 326, and a cylinder pressure sensor 330, and an accumulator pressure sensor 332.

The PCU 310 regulates the pneumatic air pressure delivered to the piston 94 for selective and adjustable actuation of the piston 94.

As discussed above, the cylinder 124 is connected to the compressor 320 for receiving pressurized air. The compressor 320 is operatively connected to the PCU 310. The PCU 310 sends electronic signals to the compressor 320 for activation thereof. It is contemplated that the PCU 310 could also be configured to receive signals from the compressor 320.

As also discussed above, an accumulator 322, in fluid communication with the compressor 320 (connected downstream of the compressor), stores compressed air for actuation of the piston 94 and helps to reduce the response time for actuation of the piston 94. Thus the compressor 320 is connected to the cylinder 124 via the accumulator 322. Pressurized air flows from the compressor 320 to the accumulator 322, and from the accumulator 322 to the cylinder 124. It is contemplated that an additional air flow path could be provided for pressurized air to flow from the compressor 320 to the cylinder 124 without passing through the accumulator 322. It is contemplated that the accumulator 322 could be omitted.

An air inlet valve 324, connected between the accumulator 322 and the cylinder 124 allows air flow from the accumulator 322 to the cylinder 124. The air inlet valve 324 is opened when the pressure inside the cylinder 124 (as determined by the cylinder pressure sensor 330) is less than desired, and if pressurized air at a higher pressure than that in the cylinder 124 is available from the accumulator 322 (as determined by the accumulator pressure sensor 332).

An air outlet valve 326 connected to the cylinder 124 allows pressurized air in the cylinder 124 to be vented to the atmosphere. The air outlet valve 326 is opened if the pressure in the cylinder 124 is greater than desired.

The air inlet valve 324 and the air outlet valve 326 are each operatively connected to the PCU 310. The valves 324, 326 can each be configured to open at particular pressure set-points. The pressure set-points for the valves 324, 326 can be assigned electronically or adjusted mechanically. The PCU 310 sends control signals to the valves 324, 326 to actuate their opening and closing. It is contemplated that the PCU 310 could also be configured to receive signals from the valves 324, 326. It is contemplated that the air inlet valve 324 and the air outlet valve 326 could be replaced with a single proportional relay valve.

An accumulator pressure sensor 332 is connected to the accumulator 322 to measure the air pressure in the accumulator 322. In the illustrated implementation, the accumulator pressure sensor 332 is connected downstream of the accumulator 322, between the accumulator 322 and the air inlet valve 324. It is however contemplated that the accumulator pressure sensor 332 could be connected elsewhere on the accumulator 322.

A cylinder air pressure sensor 330 measures the air pressure in the cylinder 124. The cylinder air pressure sensor 330 is shown connected between the air inlet valve 324 and the cylinder 124.

The pressure sensors 330, 332 are each communicatively connected to the PCU 310. The PCU 310 is configured to receive data and/or signals from the pressure sensors 330, 332 indicative of the air pressure sensed by the pressure sensors 330, 332. It is contemplated that the PCU 310 could also be configured to send control or data signals to the pressure sensors 330, 332. The PCU 310 is further configured to send control signals to the air inlet valve 324, the air outlet valve 326, and the compressor 320 based in part on the signals received from the pressure sensors 330, 332.

As mentioned above, it is contemplated that a pressurized gas cartridge could be used instead of the compressor 320 and accumulator 322. In such an implementation, the PCU 310 would be operatively connected to the gas cartridge, and configured to send control or data signals thereto based on signals received from other sensors such as the cylinder pressure sensor 330.

The PCU 310 is in communication with the ECU 200 for controlling operation of the piston 94. It is contemplated that some or all the functions of the PCU 310 could be integrated with the ECU 200.

In the illustrated implementation of the snowmobile 10, a piston force selector 380 is also provided. The piston force selector 380 is operable by the driver of the snowmobile 10 for actuating the piston and?or selecting a desired piston force Pf. The PCU 310 communicates with the piston force selector 380 for optionally controlling the piton force Pf based in part on the selected piston force. The piston force selector 380 could be in the form of a push-button, switch, knob, lever, or the like, that can be moved between a plurality of piston force selection positions, for example, 0, low and high.

Turning now to FIGS. 6 to 10, several methods of pneumatically controlling the CVT 40 will now be described.

In the illustrated implementation of the method of controlling the CVT 40, the centrifugal weights 120 of the CVT 40 are optimized for operating in the SPORT mode and at a high altitude (defined, in this implementation of the vehicle 10, as 2000 m above sea level and higher). Thus, in the SPORT mode and at a high altitude, the force Fp applied by the piston 94 on the moveable sheave 84 is zero. The driving pulley diameter D1 is determined based on the engine speed ES, which is in turn controlled by the ECU 200 based on an engine speed control map (not shown) for the sport mode.

In the absence of any force Fp being applied by the piston 94, the engine speed ES obtained for a given throttle valve position TVP and ignition timing IT is greater at low altitudes than at high altitudes due to the increased atmospheric air pressure at low altitudes. The higher atmospheric air pressure at low altitudes results in a greater amount of air being inducted through the throttle body into the combustion chamber for the same throttle valve opening TVP. In order to maintain the stoichiometric ratio of the fuel-air mixture, a greater amount of fuel is injected to the engine 24 at low altitudes than at high altitudes which therefore produces more power, and rotates the crankshaft 57 at a higher engine speed ES for the same throttle valve opening TVP.

The pneumatic piston 94 allows the engine speed ES to be controlled independently of the throttle valve position TVP. The pneumatic piston can be actuated to reduce the engine speed ES and thus compensate for this altitude related increase in engine speed ES.

Figure 6:
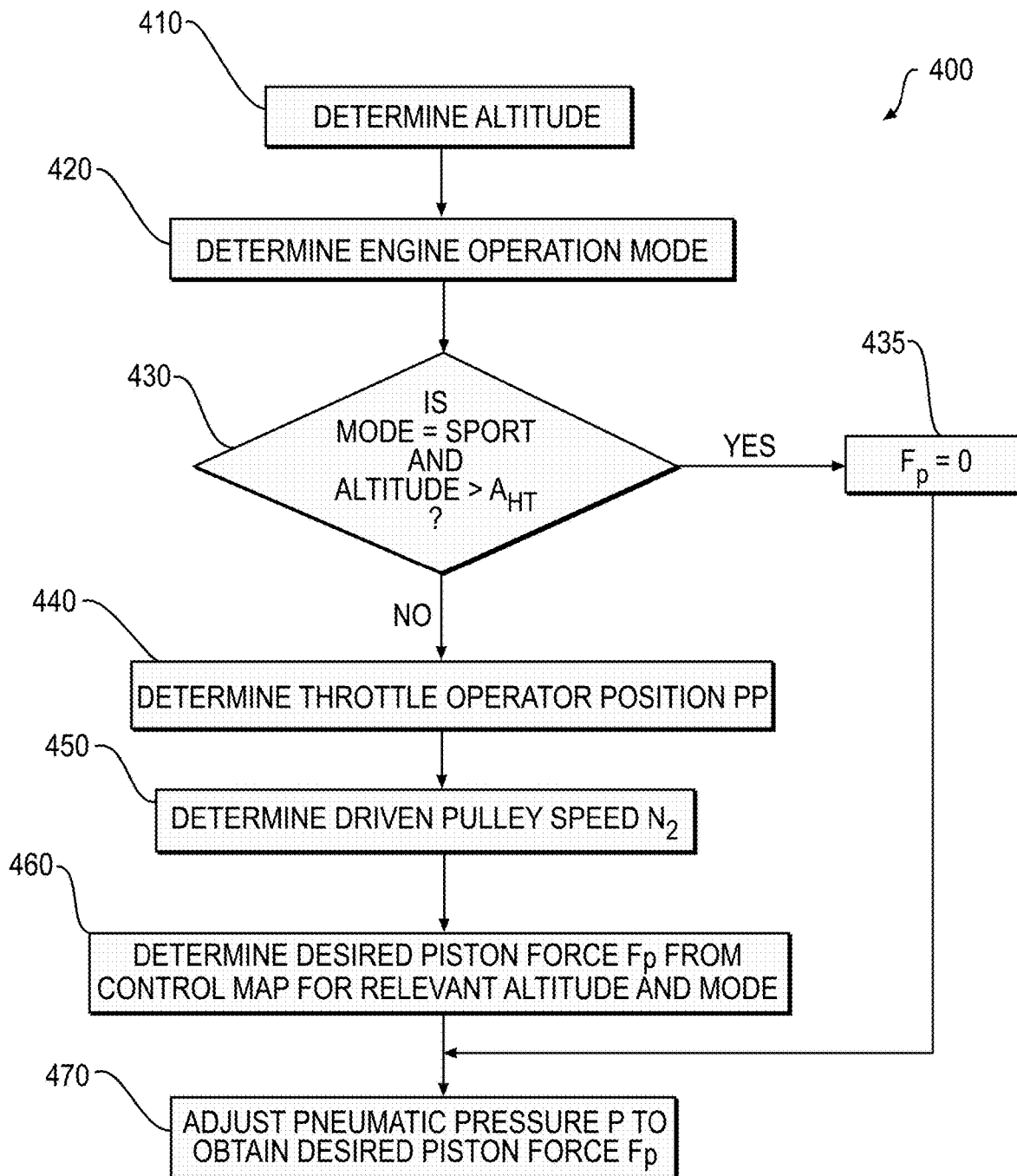
FIG. 6 is a logic diagram illustrating a method of controlling the CVT at different altitudes and in different modes.

Turning now to FIG. 6, the method 400 of controlling the CVT 40 to compensate for altitude will be described in detail.

The method starts at step 410 where the PCU 310 determines the altitude based on the signal received from the altitude sensor.

Then, at step 420, the PCU 310 determines the operation mode based on the signal received from the mode switch 62 or based on a key.

Then the method 400 proceeds to step 430, where it determines whether the mode is SPORT and the altitude is at least as great as a high altitude threshold $A_{HT}$ (i.e. the altitude is high), based on signals received from the mode switch sensor 210 and the altitude sensor 205 via the ECU 200. In the illustrated implementation, the high altitude threshold $A_{HT}$ is set to be 2000 m, but it is contemplated that the high altitude threshold $A_{HT}$ could be other than 2000 m. If at step 430, the mode is determined to be SPORT, and the altitude is determined to be high, the method 400 proceeds to step 435 where the piston force Fp is set to be zero for all values of throttle operator position PP and driven pulley speed $N_2$. If at step 430, the mode is determined to not be SPORT (i.e. mode is STD or ECO), or if the altitude is determined to be 2000 m or less (i.e. the altitude is low), the method 400 proceeds to step 440.

At step 440, the PCU 310 determines the throttle operator position PP based on the signal received from the throttle position sensor 204 and then proceeds to step 450, where the PCU 310 determines the driven pulley speed $N_2$ based on the signal received from the driven pulley speed sensor 203. The method 400 then advances to step 460.

Figure 7:
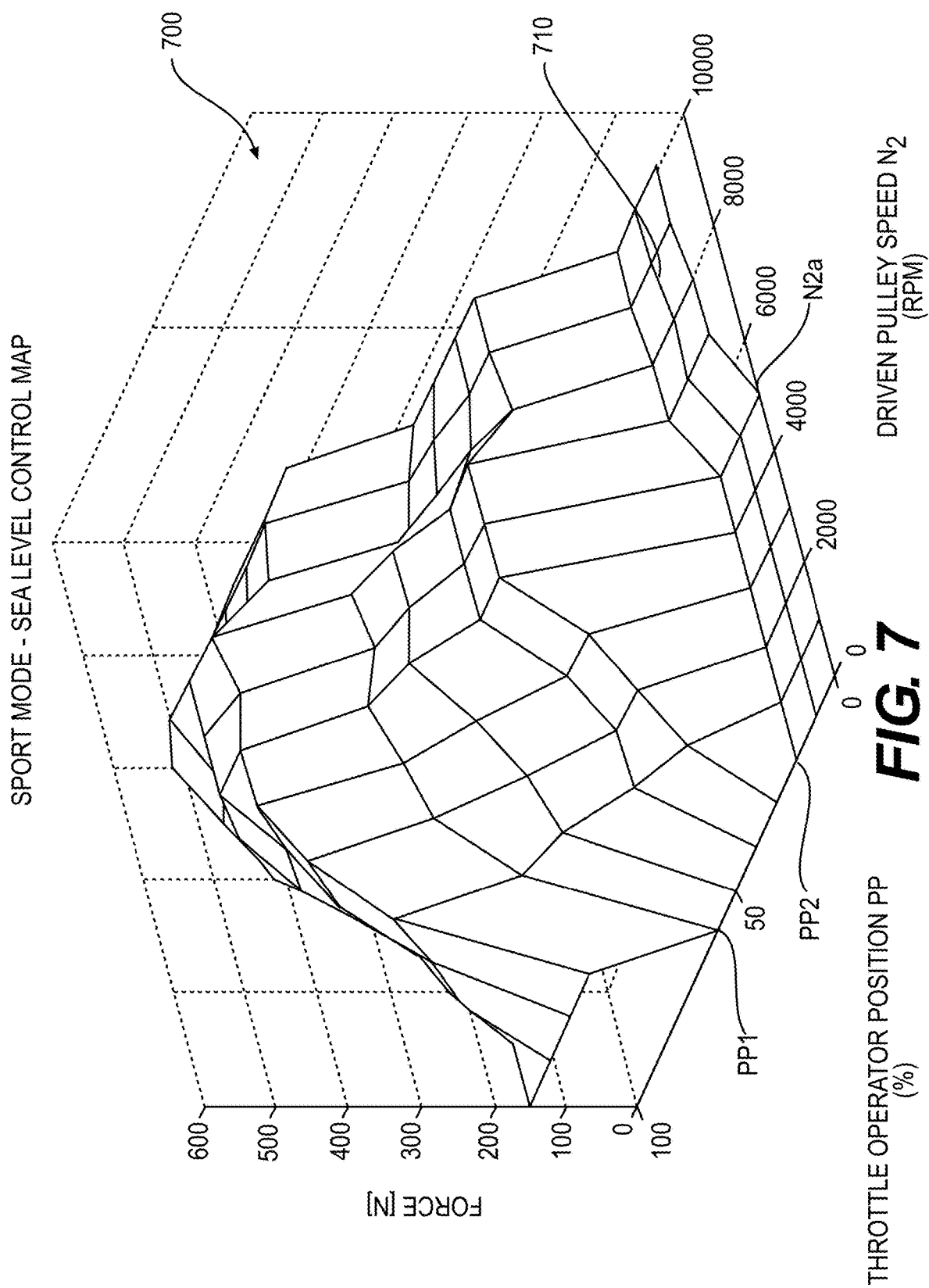
FIG. 7 is illustrates a piston force control map for operation in the sport mode at sea level.
Figure 8A:
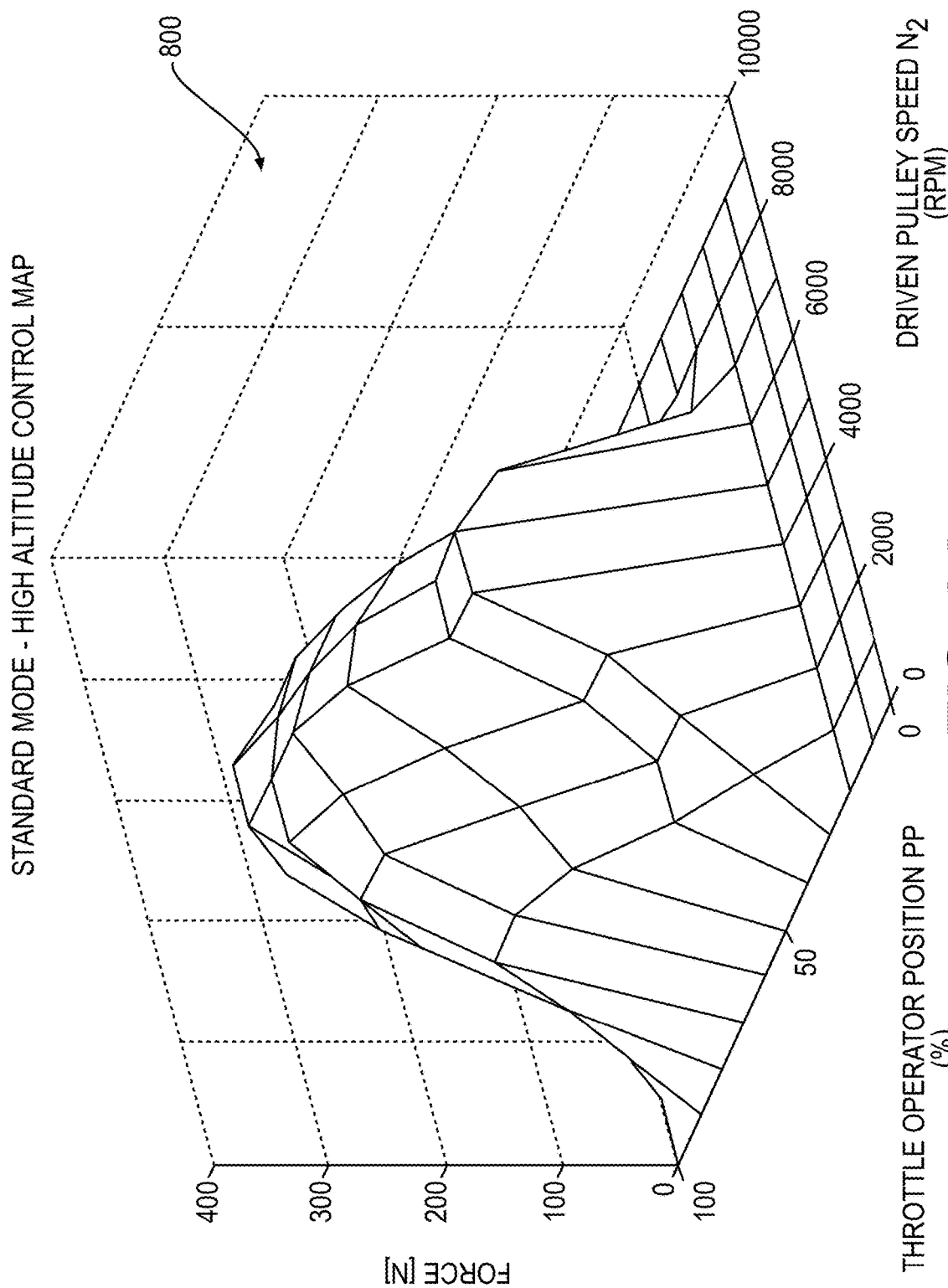
FIG. 8A illustrates a piston force control map for operation in the standard mode at high altitude.
Figure 8B:
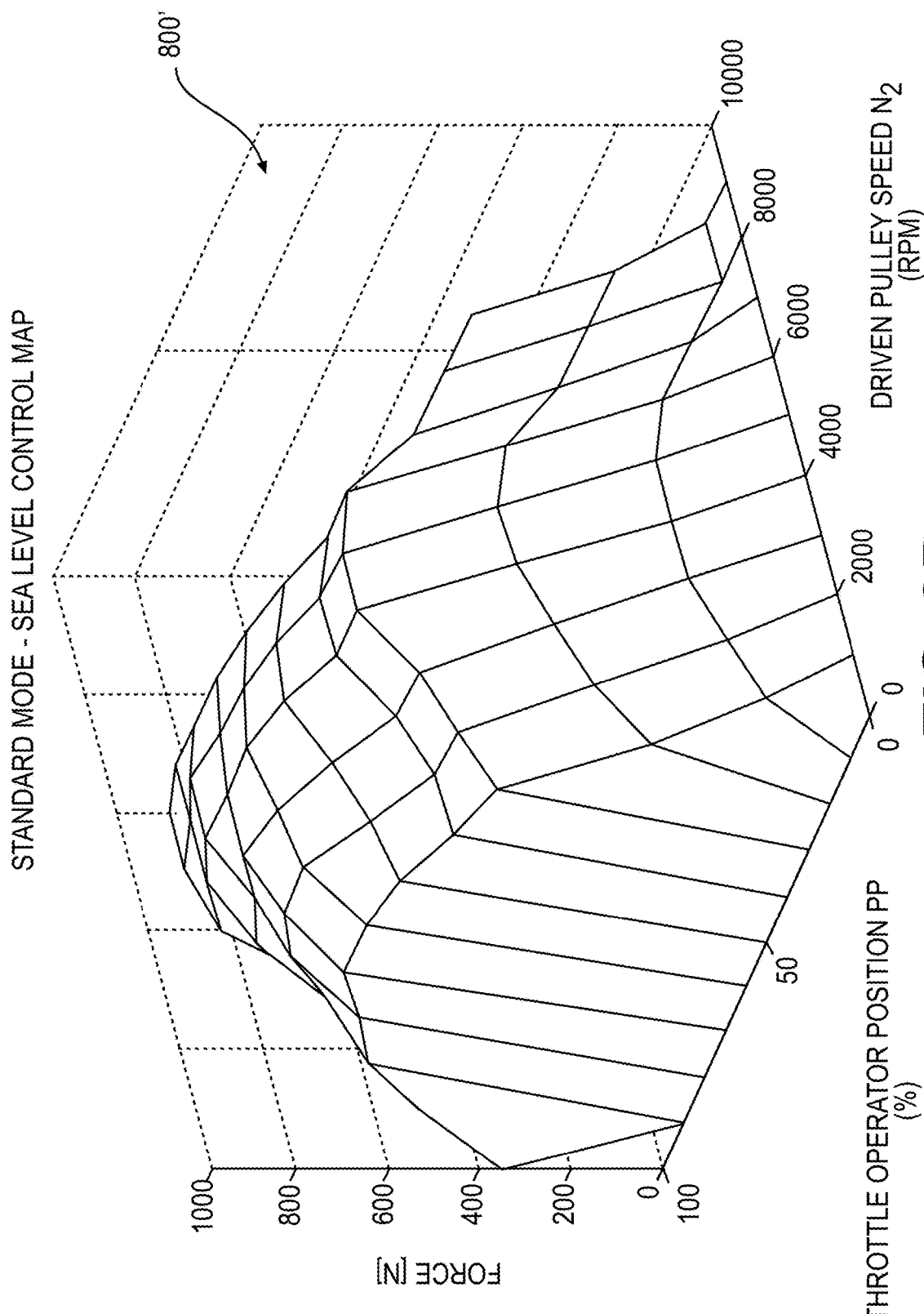
FIG. 8B illustrates a piston force control map for operation in the standard mode at sea level.
Figure 9A:
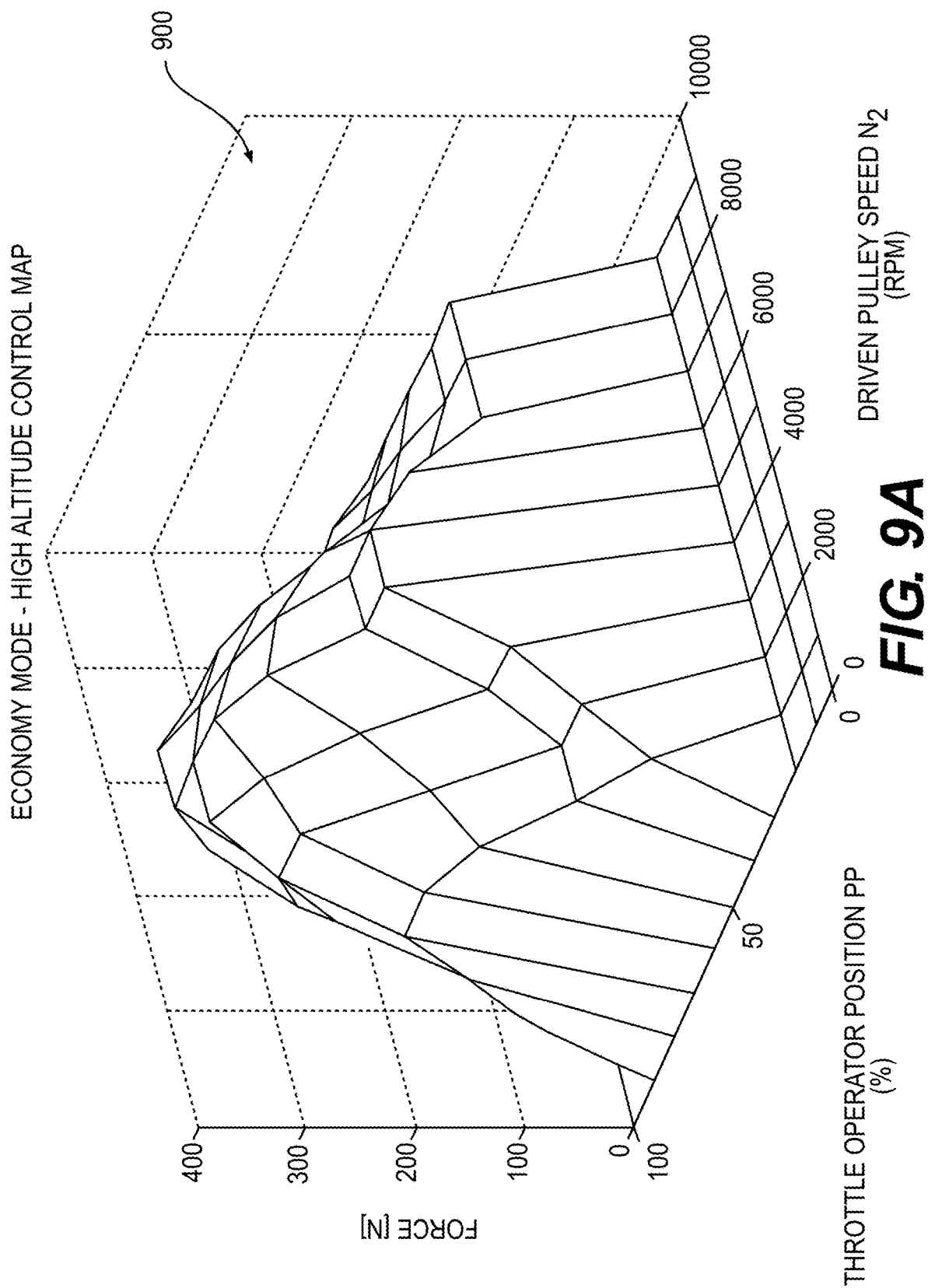
FIG. 9A illustrates a piston force control map for operation in the economy mode and at high altitude.

At step 460, the PCU 310 obtains the desired piston force Fp to be applied to the piston 94 from the appropriate piston force control map for the given mode and altitude. If the mode is SPORT and the altitude is low, the PCU 310 obtains piston force Fp from the SPORT MODE-LOW ALTITUDE control map (FIG. 7). If the mode is STD and the altitude is low, the PCU 310 obtains piston force Fp from the STD MODE-LOW ALTITUDE control map (FIG. 8B). If the mode is STD and the altitude is high, the PCU 310 obtains piston force Fp from the STD MODE-HIGH ALTITUDE control map (FIG. 8A). For ECO mode and low altitude, the PCU 310 obtains piston force Fp from the ECO MODE-LOW ALTITUDE control map (FIG. 9B), and for ECO mode and high altitude, the PCU 310 obtains piston force Fp from the ECO MODE-HIGH ALTITUDE control map (FIG. 9A).

Finally, at step 470, the PCU 310 adjusts the pneumatic pressure P in the cylinder 144 based on the desired piston force Fp obtained from the relevant control map in step 470. The PCU 310 receives signals from the pressure sensors 330, 332 and sends signals to the compressor 340, and the valves 324, 326 to adjust the pneumatic pressure to the desired value.

In the illustrated control method 400, the PCU 310 uses the high altitude control map for any altitude greater than or equal to the high altitude threshold $A_{HT}$, and the sea level control map for altitudes of lower than the high altitude threshold $A_{HT}$. It is contemplated that, for intermediate altitudes between high altitude threshold $A_{HT}$ and sea level, the PCU 310 could interpolate between the high altitude and sea level control maps for the given mode. It is contemplated that more than two control maps could be used for altitude compensation, for example, an additional control map could be provided for intermediate altitudes between the high altitude threshold $A_{HT}$ and sea level. It is contemplated that a low altitude threshold $A_{LT}$ could be defined, a low altitude control map could be used for altitudes up to the low altitude threshold $A_{LT}$, and an intermediate altitude control map could be used for altitudes between the low altitude threshold $A_{LT}$ and high altitude threshold $A_{HT}$. It is contemplated that a control map could also be provided for altitudes below sea level.

When the vehicle 10 is operated at sea level in the SPORT mode, the piston 94 applies a force Fp on the moveable sheave 84 of the driving pulley 80 based on the throttle operator position PP and the driven pulley speed $N_2$ (which is related to the vehicle speed VS in a known manner). It is contemplated that the piston force Pf could be determined based on the throttle valve position TVP instead of the throttle operator position PP. FIG. 7 shows a piston force control map 700 for low altitudes and in sport mode.

As can be seen in FIG. 7, a piston force Pf is exerted when the throttle operator position PP is greater than a minimum threshold PP2 (about 20% in this implementation) or when the driven pulley speed $N_2$ exceeds a threshold N2a (about 5000 rpm in this implementation). For any given driven pulley speed $N_2$, the piston force Pf increases with increasing throttle operator position PP up to a maximum (in the illustrated implementation, the maximum piston force Pf is exerted at about 75% throttle operator position PP). Thereafter the piston force Pf decreases with increasing throttle operator position PP. A piston force Pf is not applied when the driven pulley speed $N_2$ is zero unless the throttle operator position PP exceeds a threshold PP1 (about 60% in the illustrated implementation). In the regime of high driven pulley speed $N_2$ and low throttle operator positions PP regime (PP<PP2, N2>N2a), the PCU 310 applies a small but non-zero piston force Pf. For throttle operator position PP greater than PP2, the piston force Fp generally increases with driven pulley speed $N_2$, up to a maximum piston force Fp and then decreases with increasing driven pulley speed $N_2$.

With reference to FIG. 8A, when operating in the STD mode at high altitude, the piston 94 applies a force Fp on the driving pulley sheave 84 so as to lower the gear ratio (D1/D2) and obtain a lower engine speed ES for a given vehicle speed VS as compared to SPORT mode. The piston force Fp applied is non-zero only when the throttle operator position PP exceeds a given minimum (20% in the illustrated implementation) and when the driven pulley speed $N_2$ is below a maximum (8000 rpm in the illustrated implementation). The piston force Fp is highest for intermediate values of driven pulley speed (approximately 5000 rpm in the illustrated implementation).

Figure 9B:
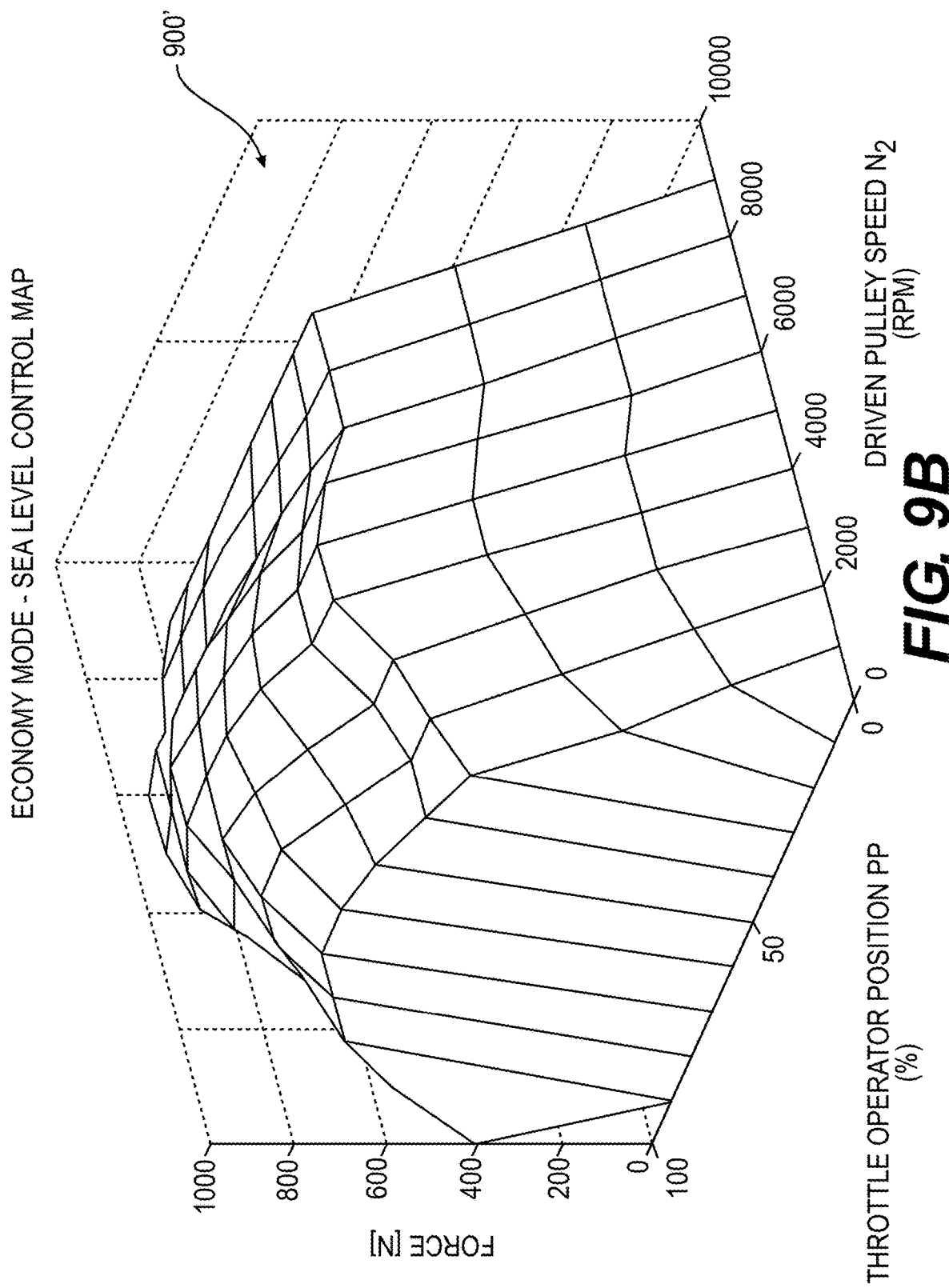
FIG. 9B illustrates a piston force control map for operation in the economy mode at sea level.

As can be seen from the control map 800' shown in FIG. 8B, when operating in the STD mode at sea level, for any given combination of driven pulley speed $N_2$ and throttle operator position PP, the piston force Fp on the driving pulley sheave 84 is larger compared to the standard mode piston force at high altitude, as well as the sport mode sea level piston force As can be seen from the control map 900 shown in FIG. 9A, when operating in the ECO mode at high altitude, the piston 94 generally applies a greater force Fp on the driving pulley sheave 84 than in the standard mode at high altitude so as to further lower the gear ratio (D1/D2) compared to the standard mode at high altitude. The piston force Fp, in the economy mode at high altitude is however not as high as the piston force Fp applied in the standard mode at sea level (FIG. 9B). In the economy mode at sea level, the piston force Fp is non-zero for all values of driven pulley speed $N_2$. At high altitude, the piston force Fp applied is non-zero only when the throttle operator position PP exceeds a given minimum (20% in the illustrated implementation which is the same as in the standard mode). The piston force Fp is highest for intermediate values of driven pulley speed (approximately 5000 rpm in the illustrated implementation).

As can be seen from the control map 900' shown in FIG. 9B, when operating in the economy mode at sea level, and as previously mentioned, the piston 94 force Fp on the driving pulley sheave 84 is increased compared to the economy mode high altitude piston force Fp as well as the standard mode sea level piston force Fp. The piston force Fp is increased in order to compensate for the increased engine speed ES due to the increase in air pressure.

It is contemplated that the control maps 700, 800, 800', 900, 900' discussed above for controlling the piston force Pf could correspond to different air pressures instead of different altitudes.

It is contemplated that, in addition to the control maps 700, 800, 800', 900, 900' used in the altitude compensation method 400 of FIG. 6, the PCU 310 could also be connected to the ECU 200 and/or other sensors such as the engine speed sensor 208, in a closed loop feedback control for adjusting the piston force Pf to achieve a target engine speed ES.

Figure 10:
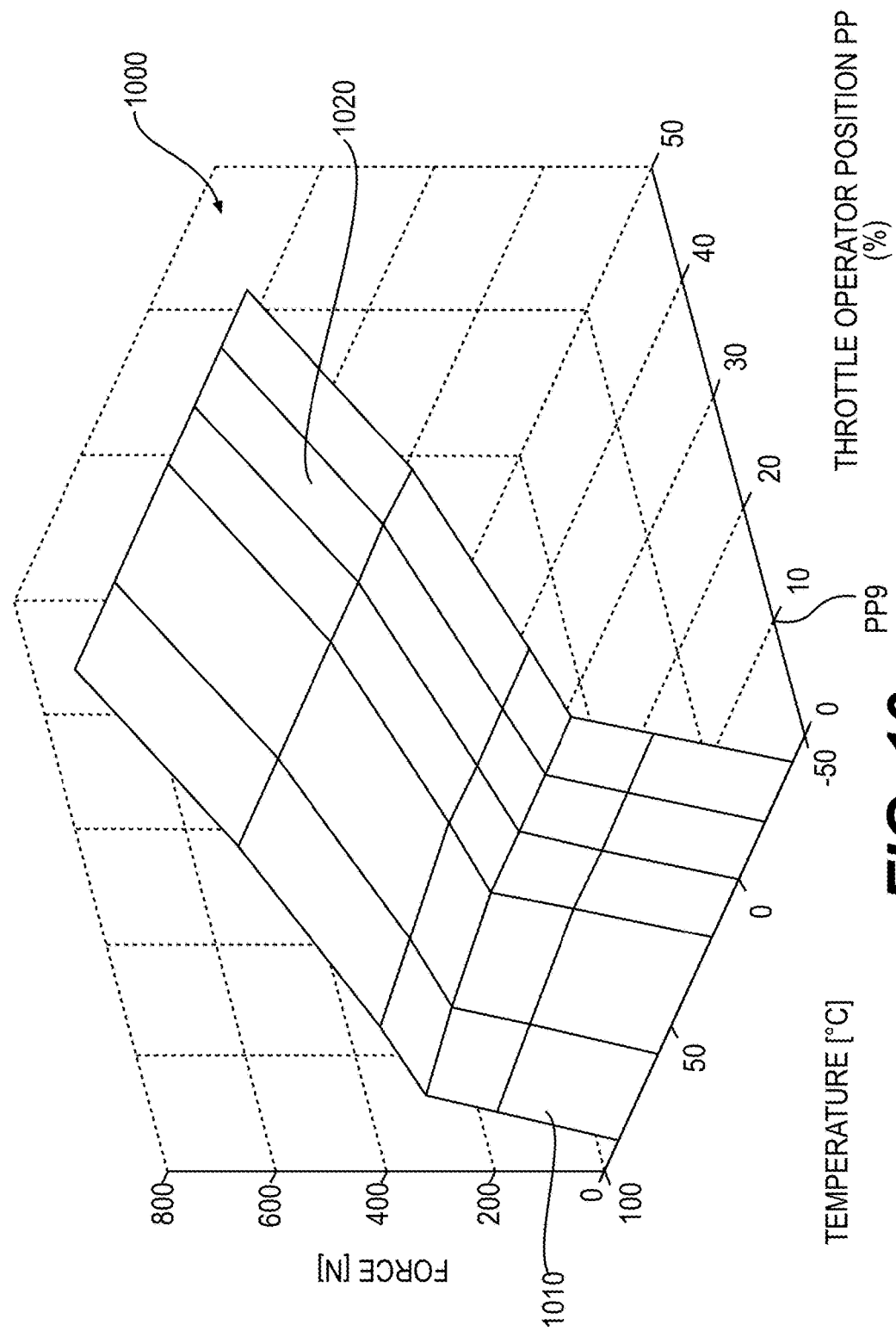
FIG. 10 illustrates a parking/drive-away piston force control map for the standard and economy modes showing the piston force as a function of throttle operator position and engine temperature.

Turning now to FIG. 10, a parking or drive-away control function of the PCU 310 will be described in detail.

When the vehicle 10 is started, the engine 24 has to be revved up so as to increase the engine speed ES beyond the engagement speed $ES_{engage}$ in order to engage the CVT 40. Typically, the driver presses on the throttle lever 37 to increase the throttle operator position PP and to thereby increase the throttle valve opening TVP and increase the engine speed ES. The revving up of the engine 24 in this manner typically generates considerable noise in addition to increased fuel consumption.

With reference to FIG. 10, in the present implementation, the CVT 40 is pneumatically controlled using the control map 1000 in order to enable a smoother start-up of the vehicle 10 with reduced noise and fuel consumption. The CVT 40 is also pneumatically controlled when the vehicle 10 is moving at a low vehicle speed VS and when the engine 24 is operating at a low engine speed ES.

When a pneumatic force P is applied to the piston 94, the moveable sheave 84 is pushed towards the fixed sheave 82 to engage the belt 86, thereby lowering the engagement speed $ES_{engage}$. By reducing the engagement engine speed $ES_{engage}$, pneumatic control of the CVT 40 enables a quieter start with reduced fuel consumption. Once the CVT 40 is engaged, a further increase in the piston force Fp results in an increase in driven pulley speed $N_2$ and vehicle speed VS. After starting the engine 24, and engaging the CVT 40, if the driver continues to increase the throttle operation position PP, the PCU 310 increases the piston force Fp on the sheave 84 so that the vehicle speed VS can increase without requiring as much of an increase in the engine speed ES as would be needed in the absence of the pneumatic system 300. This relative reduction of engine speed ES also leads to less noise and fuel consumption.

As can be seen in FIG. 10, the parking function piston force Pf increases with the throttle operator position PP, with the rate of increase being higher for throttle operator positions PP below a threshold throttle operator position PP9 (10% in the illustrated implementation). The threshold throttle operator position PP9 is generally set to be at the level where the vehicle 10 starts moving. In the region 1010 of the control map 1000, (PP<PP9), the vehicle 10 has not yet started moving while in the region 1020 (PP>PP9), the vehicle 10 is moving at slow speeds VS and the engine 24 is operating at low engine speeds ES). A parking function piston force Pf is applied for throttle operator positions PP up to 50% and the maximum parking function piston force Pf applied is approximately 700N (in this implementation, where a total force of about 2000N is needed to increase the driving pulley diameter to its maximum value.

As can be seen in FIG. 10, the piston force Fp applied to the CVT 40 is also dependent on the engine temperature $T_E$. If the engine 24 is already warm when the vehicle 10 is started, for example, if the engine 24 is started up shortly after having been shut down, the piston force Pf applied is such that the engagement speed reduction is slightly greater than if the engine 24 were started from cold. When the engine 24 is cold, it is desirable to warm up the engine 24 by allowing it to operate at slightly higher speeds. Therefore, the force applied by the piston 94 is higher for higher engine temperatures $T_E$. The temperature dependence of the piston force Pf is influenced by a number of parameters, including those related to the pneumatic system, such as friction, thermal expansion, and the like. It is also contemplated that the piston force Pf applied could be lower at higher temperatures.

The piston force Pf is also based on the mode of operation. In the sport mode, the CVT 40 is operated purely mechanically without applying any piston force Pf in order to obtain a large torque and enable the vehicle 10 to accelerate faster. A non-zero piston force Pf is applied in the STD and ECO modes. In the illustrated implementation, for a given engine temperature and throttle operator position PP, the piston force Pf is the same in the STD and ECO modes. The control map 1000 shown in FIG. 10 is used in both of the STD and ECO modes. It is however contemplated that different piston force control maps could be used in the STD and ECO modes to apply different piston forces. For example, for a given throttle operator position PP, the piston force Pf could be greater in the ECO mode than in the STD mode.

The PCU 310 causes application of a parking function piston force when it determines a parking/drive-away condition that is indicative of the vehicle 10 being in the process of parking or driving away from a parked position. The PCU 310 determines a parking/drive-away condition if the vehicle speed VS is smaller than a parking start threshold vehicle speed $VS_{P1}$, and the engine speed ES is lower than a parking threshold engine speed $ES_{P1}$. The parking threshold engine speed $ES_{P1}$ is set to 1500 rpm in the illustrated implementation. In some implementations, the parking/drive-away conditions include the brake 38 not being actuated.

When the parking/drive-away conditions above are satisfied or detected, and if the vehicle 10 is not in a SPORT mode of operation, the PCU 310 accesses the parking control map of FIG. 10 to adjust the pneumatic pressure P in order to create the piston force Pf obtained from the parking piston force control map 1000. If the vehicle 10 is in a SPORT mode and if the pneumatic pressure is at a non-zero level, the PCU 310 releases to the pneumatic pressure to ensure that the CVT is only mechanically controlled. Typically, however, the pneumatic pressure P and the piston force Pf are zero when the vehicle 10 is started. If a closed loop feedback control is being used for adjusting of the piston force Pf, it is deactivated when the parking function piston force is applied. It is contemplated that a piston force Pf could be applied even if the vehicle 10 is operating in a SPORT mode and the parking/drive-away conditions are detected. Therefore, in some implementations, a parking force control map could be provided for the SPORT mode as well.

In some implementations, the parking function piston force Pf is removed when the PCU 310 determines that the vehicle 10 has started moving (i.e., when the vehicle speed increases above a parking end threshold vehicle speed, $VS_{P2}$). In the illustrated implementation, the parking end threshold vehicle speed $VS_{P2}$ is greater than the parking start threshold vehicle speed $VS_{P1}$. It is however contemplated that the parking start threshold vehicle speed $VS_{P1}$ could be the same as the parking end threshold vehicle speed $VS_{P2}$.

In the illustrated implementation, the vehicle 10 is considered to be moving and the parking function piston force Pf is removed when vehicle speed VS increases above the parking end threshold vehicle speed $VS_{P2}$ (which is set to be at 10 km/h in the illustrated implementation), and when the engine speed ES is greater than a parking threshold engine speed $ES_{P2}$ (set to be at 2200 rpm for the ECO mode in the illustrated implementation).

The parking threshold engine speed $ES_{P2}$ is greater for the STD mode than for the ECO mode. The PCU 310 also stops application of the parking function piston force Pf if the PCU 310 determines that the engine speed ES is close to an engine stall speed $ES_{stall}$ which is different for different modes, and is generally lower than the idle engine speed $ES_{idle}$ for that mode. Additionally, if the brake 38 is determined to be actuated, the PCU 310 stops application of the parking function piston force Pf.

Figure 11A:
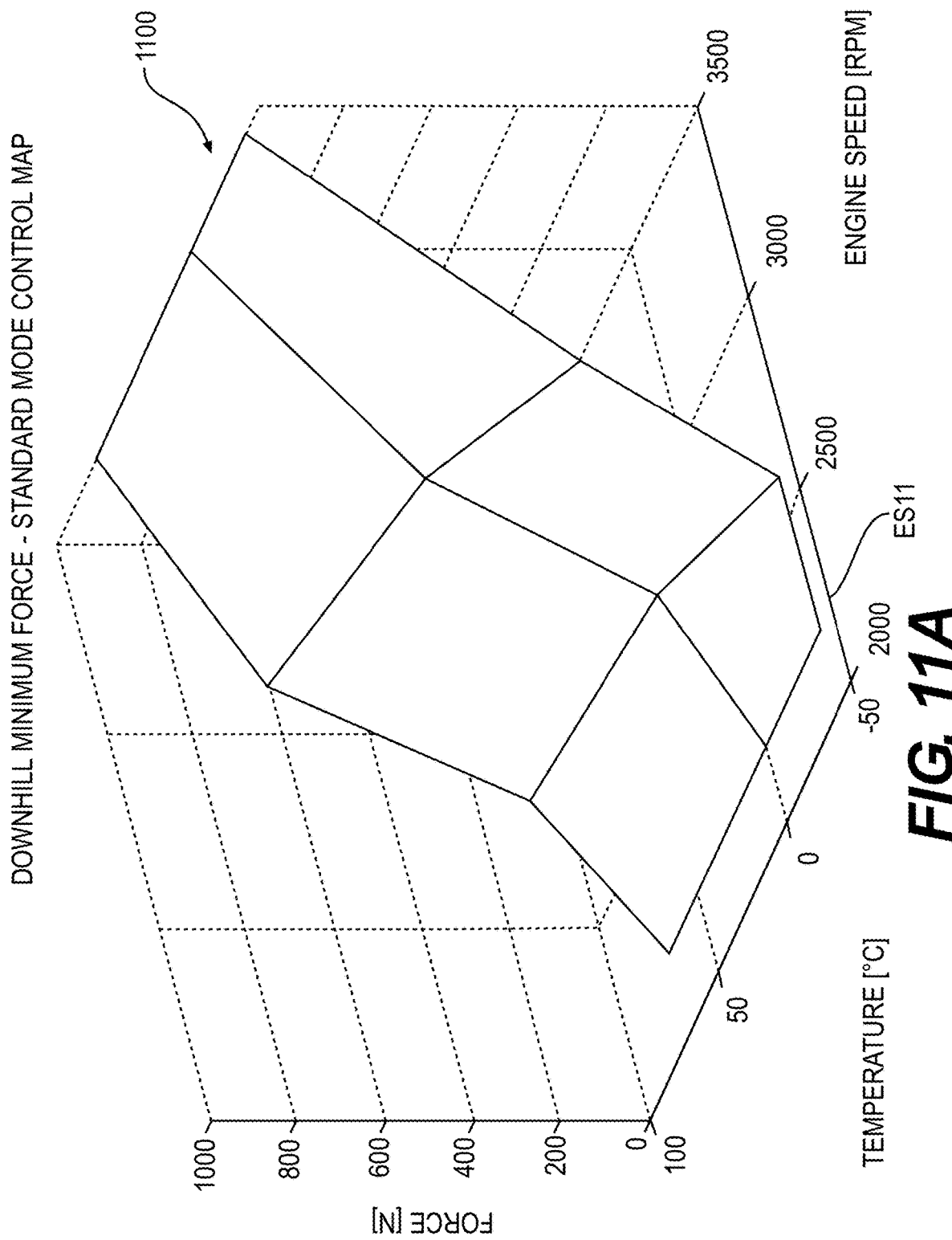
FIG. 11A illustrates a downhill-minimum force piston force control map for operation in the standard mode.
Figure 11B:
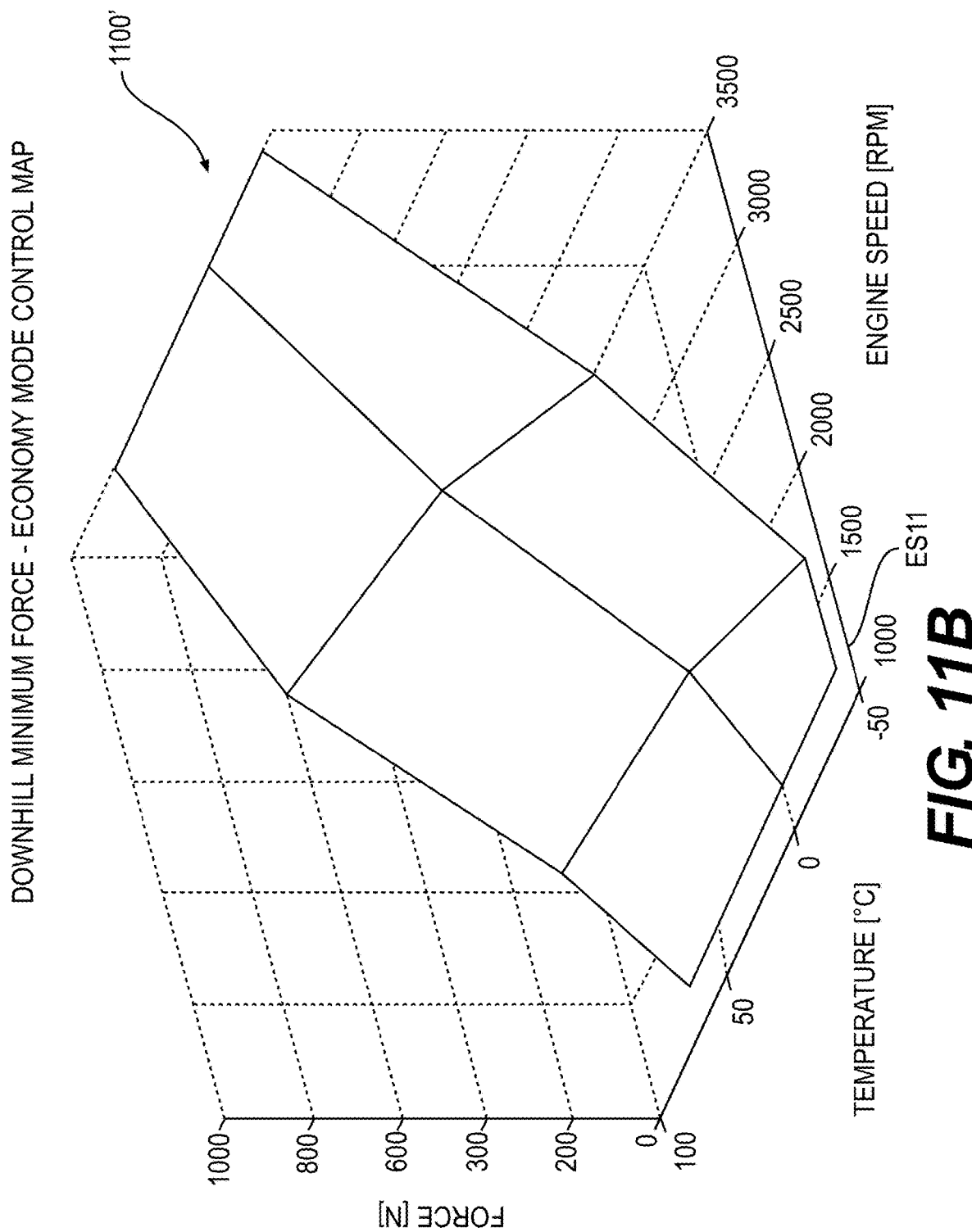
FIG. 11B illustrates a downhill-minimum force piston force control map for operation in the economy mode.

Turning now to FIGS. 11A and 11B, a minimum force control of the CVT 40 will be described in detail.

When a vehicle 10 is moving downhill, the driver sometimes releases the throttle operator 37 or holds the throttle operator 37 at a low position (i.e. PP~0%) since the vehicle 10 is being accelerated due to gravity. The ECU 200 therefore decreases the throttle valve position TVP in accordance with the throttle operator position PP. In ECO and STD mode, as a result of the throttle valve position TVP decreasing, the engine speed ES could decrease to almost zero and could cause the belt 86 of the CVT to disengage from the driving pulley 82 while the vehicle 10 continues to roll downhill. In order to prevent disengagement of the CVT 40 in the ECO and STD modes, the PCU 310 controls the piston force Pf to be at least as great as a minimum piston force Pfmin to keep the CVT 40 engaged.

When the CVT 40 is engaged (due to the minimum piston force control of the CVT 40), the vehicle speed VS and therefore driven pulley speed N2 is greater than the driving pulley speed $N_1$ and the engine speed ES. The driven pulley 88 drives the driving pulley 80 and the engine output shaft 57. In this negative load condition, the rotational speed ES of the engine crankshaft 57 driven by the driven pulley 88 is greater than that would be achieved if the crankshaft 57 were being driven by the engine 24 based on the low throttle valve position TVP. As the vehicle 10 continues to roll downhill and the driven pulley 88 drives the driving pulley 80 and the engine output shaft 57, the rotational speed of the driven pulley 88, and thereby the vehicle speed VS decreases. This deceleration of the vehicle 10 is smoother compared to that when the brakes 38 are actuated.

With reference to FIGS. 11A and 11B, the minimum piston force Pfmin is defined based on the engine speed ES, the engine temperature $T_E$, and the mode of operation as can be seen from the maps 1100 and 1100' of FIGS. 11A and 11B. The PCU 310 accesses the control map 1100 in the STD mode and the control map 1100' in the ECO mode to obtain the piston force Pf to be applied to the driving pulley 80. In the SPORT mode, the PCU 310 sets the piston force Pf to be zero. Thus the CVT 40 is controlled purely mechanically in the SPORT mode. It is contemplated that a minimum piston force could also be defined for the SPORT mode.

In the illustrated implementation, the minimum piston force control of the CVT 40, as described above with reference to FIGS. 11A and 11B, is activated when the PCU 310 determines that the engine speed ES is above a threshold speed ES11. The PCU 310 stops applying the piston force Pf from the downhill minimum force control map 1100, 1100' if the engine speed ES decreases below the threshold speed ES11, or if the driver switches the operation mode from STD and ECO modes to the SPORT mode.

It is also contemplated that the minimum piston force control could be activated when a negative load condition is detected, i.e. when the engine speed ES is greater than a downhill threshold engine speed and at least one of the following is true: the throttle operation position PP is lower than a downhill threshold throttle operation position, and the throttle valve position TVP is lower than a downhill threshold throttle valve position.

The PCU 310 also controls the pneumatic piston 94 in order to prevent stalling of the engine 24 as will be described below.

The engine 24 can stall, for example, if the throttle operator 37 is suddenly released and the brake 38 actuated, causing the throttle valve TVP to be closed by the ECU 200. Another example of a situation where the engine 24 could stall is when the brake 38 is actuated while the ground engaging member of the vehicle 10, whether it be wheels or the track 65, is not in contact with ground. If the piston 94 is currently actuated when a situation that could cause the engine 24 to stall occurs, the PCU 310 causes the pneumatic valve 326 to be opened, thereby venting the pressure P on the piston 94, and quickly deactuating the piston 94. When the piston 94 is deactuated, the CVT 40 disengages, thereby isolating the engine 24 from the suddenly braking wheels. The engine 24 would continue operating at low engine speeds less than $ES_{engage}$, so that when the driver releases the brake 38 and begins actuating the throttle operator 37, the engine speed ES can be quickly increased in response to the throttle operator position PP.

The stall protection control of the CVT 40 by the PCU 310 is activated when the PCU 310 detects a stall condition. In the illustrated implementation, the stall condition includes a high negative rate of change of the driven pulley speed $N_2$. In the illustrated implementation, the rate of change of the driven pulley speed is determined to be high when the magnitude of the rate of change is than greater than a stall threshold rate, which is set to be 150 rpm/s². It is however contemplated that the stall threshold rate could be different than 150 rpm/s². It is also contemplated that the stall protection control could be activated if the brake 38 is actuated when a high negative rate of change of the driven pulley speed $N_2$ occurs.

The pneumatic piston 94 is controlled by the PCU 310 to enable a smooth start from a temporary stop on an uphill gradient. When the brake 38 is deactuated after having been actuated, if the PCU 310 detects an opposite direction of rotation of the driven pulley 88 (negative driven pulley speed $N_2$), the PCU 310 determines that the vehicle 10 is positioned on an incline and facing uphill uphill stand condition). Alternately, the detection of the uphill stand condition could also be based in part on the inclination of the ground as determined by the acceleration sensor 205 or the inclination sensor 280 provided on the vehicle 10.

When the uphill stand condition is detected, the PCU 310 increases the piston force Fp at a defined rate (~2000N/s in the illustrated implementation). The PCU 310 continues to increase the piston force Pf either until the driven pulley speed $N_2$ is detected to be zero, or up to a pre-defined maximum piston force Fp (700N in the illustrated implementation). In the illustrated implementation, the piston force Pf is increased at a rate such that the piston force Pf reaches the maximum piston force within an uphill stand threshold time period. In the illustrated implementation, the uphill stand threshold time period is 1 second.

If the driven pulley speed $N_2$ is detected to be zero, the piston force Pf is maintained at the level at which driven pulley speed $N_2$ is detected to be zero. Once the piston force Pf increases to the pre-defined maximum level for the uphill stand condition control, the piston force Pf is maintained at that level. The uphill stand pneumatic control of the CVT 40 ends when the throttle operator 37 is actuated by the driver, i.e. when throttle operator position PP is non-zero, PP>0 or when the brake 38 is actuated, at which point, the piston force Fp is returned to its default value (i.e. the value based on its mode of operation, engine speed ES and other operational parameters).

The above description referred to a snowmobile 10 having a CVT 40 with a pneumatic piston 94. It should however be understood that the control methods could be applied to other vehicles and devices which use a CVT. It will also be understood that the piston 94 could be actuated hydraulically, with oil or other such incompressible fluids, instead of pneumatically with compressed gas.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of operating a vehicle,
   the vehicle comprising:
   an engine;
   a throttle operator being moveable by a driver of the vehicle;
   a throttle valve regulating airflow to the engine, a throttle valve position being based at least in part on a throttle operator position;
   a continuously variable transmission (CVT) operatively connected to the engine, the CVT including a driving pulley, a driven pulley, and a belt operatively connecting the driving pulley to the driven pulley;
   at least one ground engaging member operatively connected to the driven pulley and comprising at least one of: a wheel and a track;
   a piston operatively connected to the driving pulley for applying a piston force to the driving pulley when actuated and thereby changing an effective diameter of the driving pulley; and
   a control unit for controlling actuation of the piston and the piston force,
   the method comprising:
   determining an engine speed;

determining at least one of the throttle operator position and the throttle valve position;
detecting a negative load condition indicative of a negative load on the engine, the negative load condition comprising:
the engine speed being greater than a downhill threshold engine speed; and
at least one of:
the throttle operator position being lower than a downhill threshold throttle operator position; and
the throttle valve position being lower than a downhill threshold throttle valve position;
and
responsive to the detection of the negative load condition, controlling the piston force based on the engine speed.

2. The method of claim 1, wherein the piston force is set to be at least as great as a minimum piston force, the minimum piston force being predefined based on the determined engine speed.

3. The method of claim 1, wherein the piston force is controlled independently of the throttle valve position and the throttle operator position when the negative load condition is detected.

4. The method of claim 1, wherein the vehicle further comprises an engine coolant temperature sensor sensing a temperature of an engine coolant, the method further comprising:
determining the engine coolant temperature; and
controlling the piston force based on the engine coolant temperature.

5. The method of claim 4, wherein the piston force is:
a first piston force when the engine coolant temperature is a first engine coolant temperature, the first engine coolant temperature being lower than a threshold engine coolant operating temperature; and
a second piston force when the engine coolant temperature is a second engine coolant temperature, the second engine coolant temperature being higher than the threshold engine coolant operating temperature, the second piston force being lower than the first piston force.

6. The method of claim 1, wherein the vehicle further comprises a mode switch for selecting one of a plurality of modes of operation of the vehicle, the method further comprising:
determining the one of the plurality of modes of operation that has been selected; and
controlling the piston force based at least in part on the selected one of the plurality of modes of operation of the vehicle.

7. The method of claim 1, wherein the piston is at least one of: pneumatically actuated and hydraulically actuated.

* * * * *